United States Patent
Gundel et al.

(10) Patent No.: US 12,062,891 B2
(45) Date of Patent: Aug. 13, 2024

(54) ELECTRICAL POWER CABLE PREPARATION DEVICE

(71) Applicants: 3M Innovative Properties Company, St. Paul, MN (US); Connected Intelligence Systems, Ltd., Netanya (IL)

(72) Inventors: Douglas B. Gundel, Cedar Park, TX (US); Assaf Kaufman, Tal Shahar (IL); Uri Bar-Ziv, Zichron Yaakov (IL)

(73) Assignees: 3M Innovative Properties Company, St. Paul, MN (US); Connected Intelligence Systems, Ltd., Netanya (IL)

( * ) Notice: Subject to any disclaimer, the term of this patent is extended or adjusted under 35 U.S.C. 154(b) by 527 days.

(21) Appl. No.: 17/309,755

(22) PCT Filed: Dec. 20, 2019

(86) PCT No.: PCT/US2019/067984
§ 371 (c)(1),
(2) Date: Jun. 17, 2021

(87) PCT Pub. No.: WO2020/132526
PCT Pub. Date: Jun. 25, 2020

(65) Prior Publication Data
US 2022/0060002 A1  Feb. 24, 2022

Related U.S. Application Data

(60) Provisional application No. 62/846,351, filed on May 10, 2019, provisional application No. 62/784,214, filed on Dec. 21, 2018.

(51) Int. Cl.
*H02G 1/12* (2006.01)
*H04N 7/18* (2006.01)
*H04N 23/51* (2023.01)

(52) U.S. Cl.
CPC ......... *H02G 1/1265* (2013.01); *H02G 1/1248* (2013.01); *H02G 1/127* (2013.01); *H04N 7/188* (2013.01); *H04N 23/51* (2023.01)

(58) Field of Classification Search
None
See application file for complete search history.

(56) References Cited

U.S. PATENT DOCUMENTS 2,474,275 A   6/1949  Manuel et al.
3,128,658 A   4/1964  Mitchell et al.
(Continued)

FOREIGN PATENT DOCUMENTS

CH   641278 A5   2/1984
CN   1161763 A   10/1997
(Continued)

OTHER PUBLICATIONS

International Preliminary Report on Patentability from International Application No. PCT/US2019/067984, dated Jul. 1, 2021, 8 pp.
(Continued)

*Primary Examiner* — Hwei-Siu C Payer
(74) *Attorney, Agent, or Firm* — Shumaker & Sieffert, P.A.

(57) ABSTRACT

Techniques, systems and articles are described for preparing electrical cables for connections to a power grid. In one example, a system includes a rotatable tool head having a plurality of rollers, a cutting tool, a signal reflection target coupled to the at least one cutting tool, a transceiver configured to transmit a signal toward the reflection target and detect a reflected signal from the reflection target; and at least one computing device configured to cause the transceiver to transmit the signal toward the reflection target and determine, based on the reflected signal, a current relative position of the cutting tool.

20 Claims, 14 Drawing Sheets

(56) References Cited

U.S. PATENT DOCUMENTS

| | | |
|---|---|---|
| 3,601,891 A | 8/1971 | Destito |
| 4,301,399 A | 11/1981 | Miller et al. |
| 4,321,643 A | 3/1982 | Vernier |
| 4,345,362 A | 8/1982 | de Givry |
| 4,424,480 A | 1/1984 | Stefan |
| 4,546,675 A * | 10/1985 | Okada .................. B65H 54/56 81/9.51 |
| 4,745,828 A | 5/1988 | Stepan |
| 4,769,910 A | 9/1988 | Noon |
| 4,802,512 A | 2/1989 | Kodera |
| 5,038,457 A | 8/1991 | Yasushi et al. |
| 5,243,882 A | 9/1993 | Stepan |
| 5,272,941 A | 12/1993 | English et al. |
| 5,323,117 A | 6/1994 | Endoh et al. |
| 5,502,374 A | 3/1996 | Cota |
| 5,515,609 A | 5/1996 | Sperti |
| 5,617,859 A | 4/1997 | Souza et al. |
| 5,756,972 A | 5/1998 | Vranicar et al. |
| 5,892,430 A | 4/1999 | Wiesman et al. |
| 5,936,725 A | 8/1999 | Pike et al. |
| 6,286,393 B1 | 9/2001 | Messer et al. |
| 6,617,859 B1 | 9/2003 | Orton |
| 6,734,662 B1 | 5/2004 | Fenske |
| 6,739,055 B2 | 5/2004 | Lee |
| 7,166,804 B2 | 1/2007 | Yumura et al. |
| 8,643,380 B1 | 2/2014 | Herbert |
| 9,917,434 B2 | 3/2018 | George et al. |
| 9,961,418 B2 | 5/2018 | Rodriguez et al. |
| 10,192,678 B2 | 1/2019 | Koo et al. |
| 10,338,103 B2 | 7/2019 | Gravermann et al. |
| 10,811,856 B2 | 10/2020 | Symington et al. |
| 11,381,061 B2 | 7/2022 | Symington et al. |
| 2005/0050713 A1 | 3/2005 | Locher et al. |
| 2005/0099636 A1 | 5/2005 | Schweser |
| 2010/0114392 A1 | 5/2010 | Lancaster |
| 2010/0308797 A1 | 12/2010 | Zimmermann |
| 2012/0047724 A1 | 3/2012 | Yano et al. |
| 2012/0192414 A1 | 8/2012 | Montena et al. |
| 2012/0199392 A1 | 8/2012 | Samuelson et al. |
| 2012/0203493 A1 | 8/2012 | Dobson et al. |
| 2012/0268106 A1 | 10/2012 | Blake, Jr. et al. |
| 2012/0306510 A1 | 12/2012 | White et al. |
| 2013/0054162 A1 | 2/2013 | Smith et al. |
| 2014/0368215 A1 | 12/2014 | Hoffman et al. |
| 2015/0062328 A1 | 3/2015 | Lauffer et al. |
| 2015/0089815 A1 | 4/2015 | Woodward |
| 2015/0120218 A1 | 4/2015 | Garnacho Vecino et al. |
| 2015/0128399 A1 | 5/2015 | Meierhans et al. |
| 2015/0287180 A1 | 10/2015 | Frey |
| 2016/0054363 A1 | 2/2016 | Rostron et al. |
| 2016/0091533 A1 | 3/2016 | Soleillant et al. |
| 2016/0139181 A1 | 5/2016 | Gravermann et al. |
| 2016/0225248 A1 | 8/2016 | Rodriguez, Jr. et al. |
| 2017/0222420 A1 | 8/2017 | Dhlamini |
| 2017/0310092 A1 | 10/2017 | Viviroli |
| 2017/0346265 A1 | 11/2017 | Soerensen |
| 2018/0017611 A1 | 1/2018 | Radun et al. |
| 2018/0059162 A1 | 3/2018 | Leblanc et al. |
| 2018/0062370 A1 | 3/2018 | Heidmann et al. |
| 2018/0238955 A1 | 8/2018 | Bango et al. |
| 2018/0252760 A1 | 9/2018 | Andle et al. |
| 2018/0328531 A1 | 11/2018 | Weisenberg et al. |
| 2019/0128927 A1 | 5/2019 | Shaw et al. |
| 2019/0293706 A1 | 9/2019 | Sohn et al. |
| 2019/0369152 A1 | 12/2019 | Fallet et al. |
| 2019/0393685 A1 | 12/2019 | Sedlacek |
| 2020/0076173 A1 | 3/2020 | Houser et al. |
| 2021/0273426 A1 | 9/2021 | Khu et al. |
| 2022/0029395 A1 | 1/2022 | Gundel et al. |
| 2022/0045491 A1 | 2/2022 | Gundel et al. |
| 2022/0060002 A1 * | 2/2022 | Gundel ................ H02G 1/1248 |

FOREIGN PATENT DOCUMENTS

| | | |
|---|---|---|
| CN | 1530965 A | 9/2004 |
| CN | 1601659 A | 3/2005 |
| CN | 101666849 A | 3/2010 |
| CN | 102116824 A | 7/2011 |
| CN | 102313861 A | 1/2012 |
| CN | 102623871 A | 8/2012 |
| CN | 202373838 U | 8/2012 |
| CN | 202978201 U | 6/2013 |
| CN | 103339813 A | 10/2013 |
| CN | 103560441 A | 2/2014 |
| CN | 104407270 A | 3/2015 |
| CN | 104518393 A | 4/2015 |
| CN | 204256093 U | 4/2015 |
| CN | 104821521 A | 8/2015 |
| CN | 104849628 A | 8/2015 |
| CN | 104979740 A | 10/2015 |
| CN | 105043457 A | 11/2015 |
| CN | 204988364 U | 1/2016 |
| CN | 205175574 U | 4/2016 |
| CN | 205263241 U | 5/2016 |
| CN | 105629136 A | 6/2016 |
| CN | 105699860 A | 6/2016 |
| CN | 205509462 U | 8/2016 |
| CN | 106025940 A | 10/2016 |
| CN | 106124948 A | 11/2016 |
| CN | 205719288 U | 11/2016 |
| CN | 106353648 A | 1/2017 |
| CN | 106451253 A | 2/2017 |
| CN | 206038828 U | 3/2017 |
| CN | 206135313 U | 4/2017 |
| CN | 106646156 A | 5/2017 |
| CN | 106771933 A | 5/2017 |
| CN | 206147041 U | 5/2017 |
| CN | 106855443 A | 6/2017 |
| CN | 106950477 A | 7/2017 |
| CN | 106980075 A | 7/2017 |
| CN | 107306021 A | 10/2017 |
| CN | 206685810 U | 11/2017 |
| CN | 107453188 A | 12/2017 |
| CN | 108169644 A | 6/2018 |
| CN | 108376884 A | 8/2018 |
| CN | 207765893 U | 8/2018 |
| CN | 108941386 A | 12/2018 |
| DE | 2928727 A1 | 2/1981 |
| DE | 3025819 A1 | 2/1982 |
| DE | 3702735 A1 | 8/1988 |
| DE | 20117063 U1 | 1/2002 |
| DE | 202008017358 U1 | 8/2009 |
| DE | 102011079935 A1 | 1/2013 |
| EP | 1902498 A1 | 3/2008 |
| EP | 2472688 A2 | 7/2012 |
| EP | 2579055 A1 | 4/2013 |
| EP | 2806277 A1 | 11/2014 |
| EP | 2818881 A1 | 12/2014 |
| EP | 3002594 A1 | 4/2016 |
| EP | 3109958 A1 | 12/2016 |
| EP | 3182428 A1 | 6/2017 |
| FR | 2282179 A1 | 3/1976 |
| FR | 2920922 A1 | 3/2009 |
| GB | 2288696 A | 10/1995 |
| GB | 2463689 A | 3/2010 |
| GB | 2542939 A | 4/2017 |
| JP | S60256068 A | 12/1985 |
| JP | H03273809 A | 12/1991 |
| JP | H06160459 A | 6/1994 |
| JP | H06308191 A | 11/1994 |
| JP | H09182237 A | 7/1997 |
| JP | H10201070 A | 7/1998 |
| JP | H11258169 A | 9/1999 |
| JP | 2004169100 A | 6/2004 |
| JP | 2012026890 A | 2/2012 |
| JP | 2015104274 A | 6/2015 |
| KR | 101317476 B1 | 10/2013 |
| KR | 101847456 B1 | 4/2018 |
| WO | 9840756 | 9/1998 |
| WO | 0042444 | 7/2000 |
| WO | 2006100590 A1 | 9/2006 |

(56) References Cited

FOREIGN PATENT DOCUMENTS

| WO | 2007052095 | A1 | 5/2007 |
|----|------------|----|--------|
| WO | 2008072226 | A2 | 6/2008 |
| WO | 2012130816 | A1 | 10/2012 |
| WO | 2014129817 | A1 | 8/2014 |
| WO | 2015179102 | A1 | 11/2015 |
| WO | 2016019666 | A1 | 2/2016 |
| WO | 2016058721 | A1 | 4/2016 |
| WO | 2016088174 | A1 | 6/2016 |
| WO | 2016088175 | A1 | 6/2016 |
| WO | 2016137424 | A1 | 9/2016 |
| WO | 2016177571 | A2 | 10/2016 |
| WO | 2016187090 | A1 | 11/2016 |
| WO | 2018087337 | A1 | 5/2018 |

OTHER PUBLICATIONS

First Office Action and Search Report, and translation thereof, from counterpart Chinese Patent Application No. 201980089846.8 dated Mar. 9, 2022, 12 pp.

Notice of Intent to Grant from counterpart Chinese Application No. 201980089846.8 dated Nov. 28, 2022, 5 pp.

Van Der Wielen, "Synchronization of online PD detection and localization setups using pulse injection", Proceedings of the 7th International Conference on Properties and Applications of Dielectric Materials, vol. 01, IEEE, Jun. 2003, pp. 327-330.

Wang et al., "Calibration of capacitive couplers for online PD detection in HV cables", IEEE Electrical Insulation Magazine, vol. 11, No. 03, IEEE, May 2005, pp. 28-39.

U.S. Appl. No. 17/757,916, filed Nov. 30, 2020, naming inventors Gundel et al.

International Search Report and the Written Opinion from International application No. PCT/US2019/067984 dated Apr. 17, 2020, 14 pgs.

U.S. Appl. No. 17/309,774, filed Jun. 17, 2021, naming inventors Gundel et al.

U.S. Appl. No. 17/309,690, filed Jun. 15, 2021 naming inventors Gundel et al.

U.S. Appl. No. 17/309,773, filed Jun. 17, 2021, naming inventors Gundel et al.

Communication pursuant to Article 94(3) EPC from counterpart European Application No. 19839756.4 dated Sep. 21, 2023, 7 pp.

Second Office Action and Search Report, and translation thereof, from counterpart Chinese Application No. 201980089846.8 dated Jul. 21, 2022, 11 pp.

Response to Communication pursuant to Article 94(3) EPC dated Sep. 21, 2023, from counterpart European Application No. 19839756.4 filed Jan. 18, 2024, 16 pp.

* cited by examiner

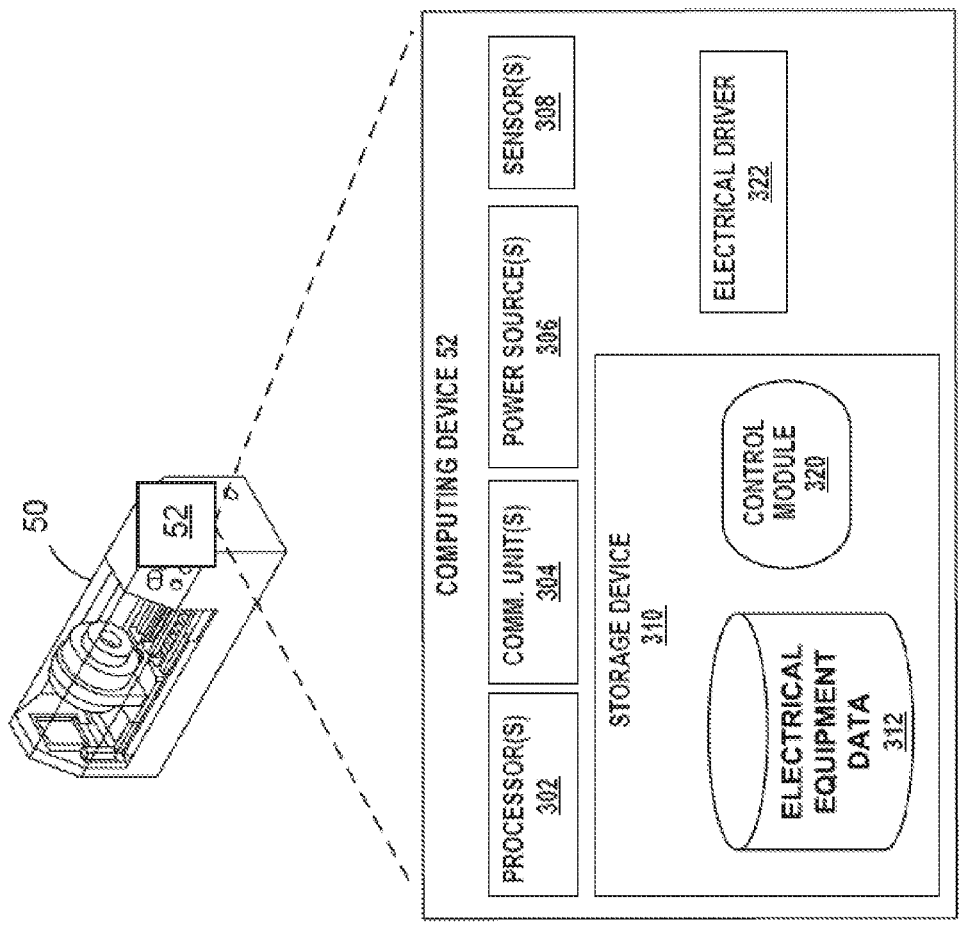
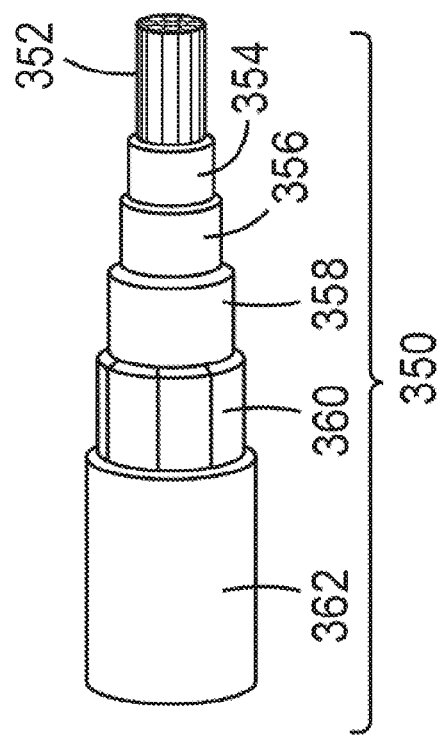
FIG. 2A
FIG. 2B

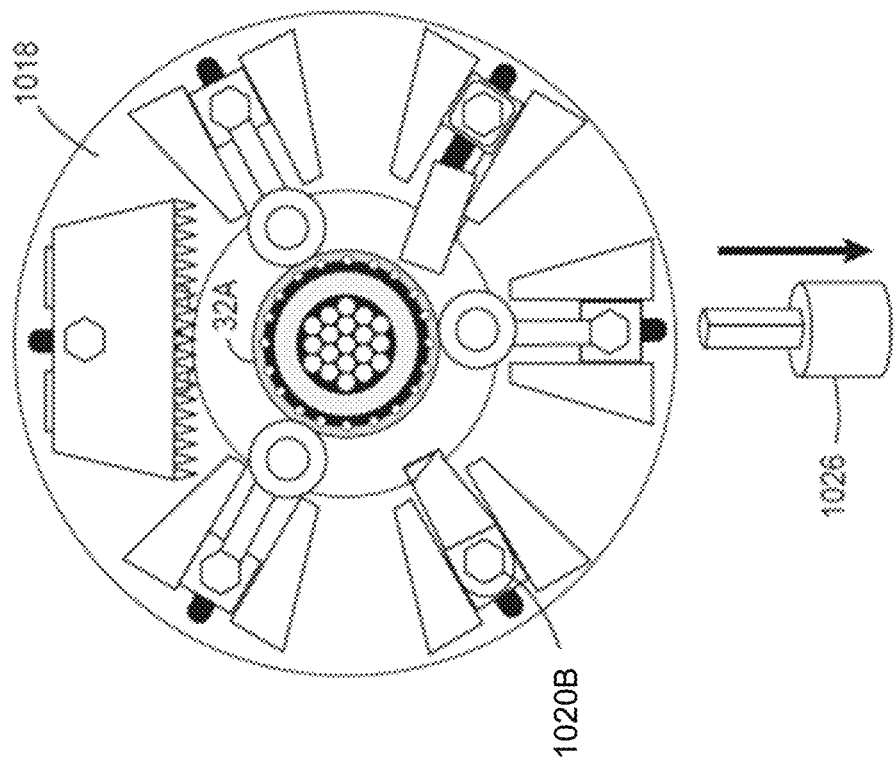
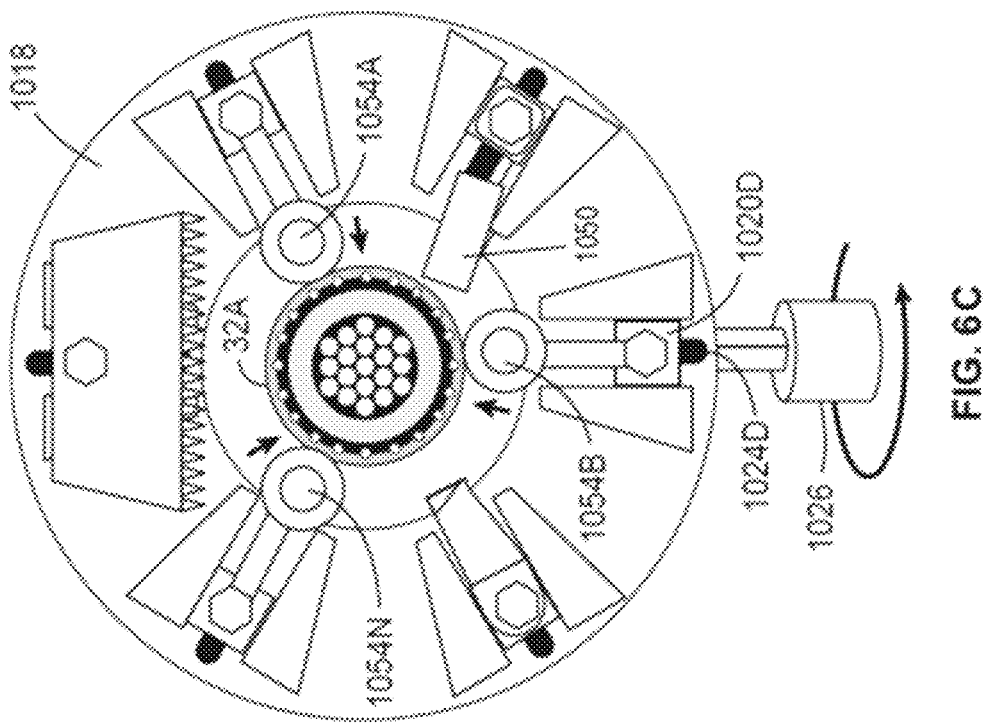

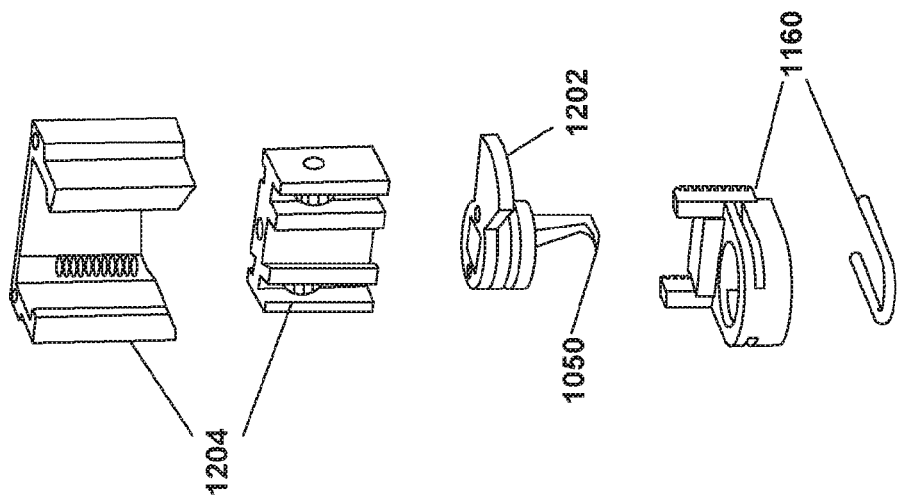
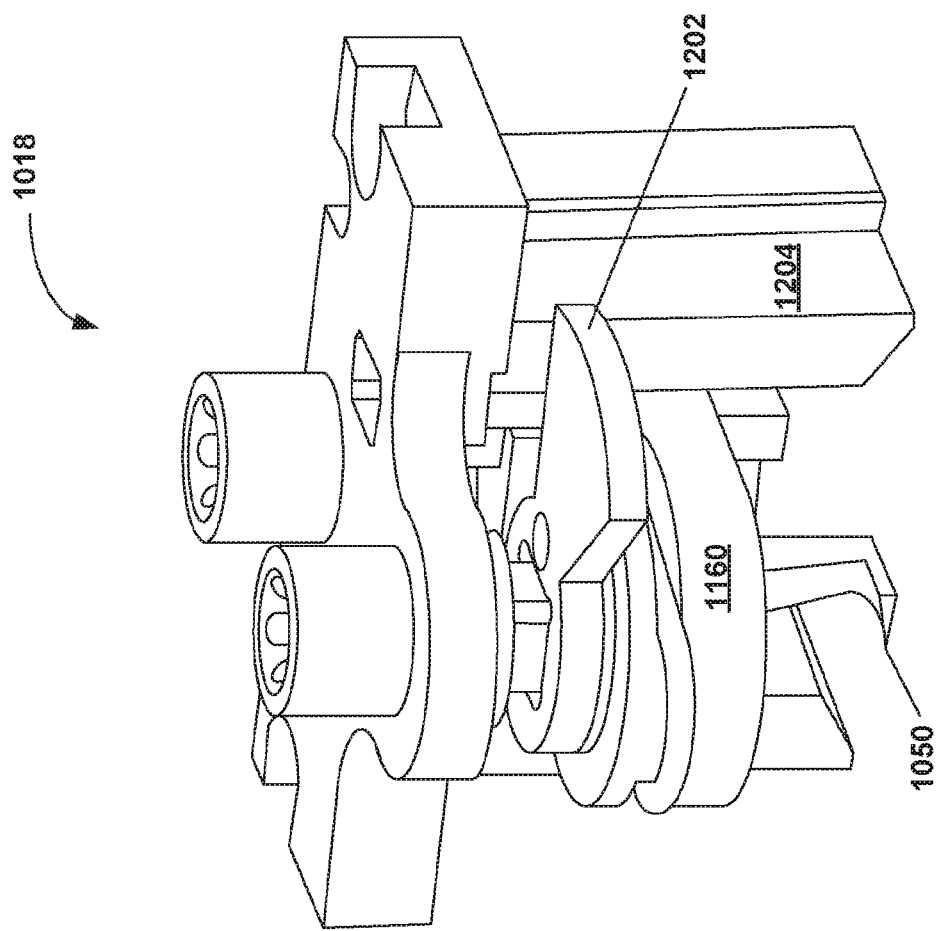
FIG. 7B
FIG. 7A

ELECTRICAL POWER CABLE PREPARATION DEVICE

This application claims the benefit of U.S. Provisional Patent Application Ser. No. 62/784,214, entitled "ELECTRICAL POWER CABLE PREPARATION SYSTEM," and filed on Dec. 21, 2018, and U.S. Provisional Patent Application No. 62/846,351, entitled "ELECTRICAL POWER CABLE PREPARATION DEVICE", and filed on May 10, 2019, the entire content of which are incorporated herein by reference.

TECHNICAL FIELD

The present disclosure relates to the field of electrical equipment, including power cables and accessories, for power utilities.

BACKGROUND

Electrical power grids include numerous components that operate in diverse locations and conditions, such as above ground, underground, cold weather climates, hot weather climates, etc. A power grid may include hundreds or thousands of discrete components, such as transformers, electrical cables, cable accessories (e.g., cable splices, terminations), etc., and a failure in the power grid may be caused by a failure in any single component or a collection of the components. Installation of electrical cables is a manual process prone to errors, which may cause failure in the electrical cable or a cable accessory.

SUMMARY

The present disclosure provides techniques for preparing electrical cables to connect to cable accessories for use in a power grid. According to examples of this disclosure, a system includes a cable preparation device configured to cut one or more layers of an electrical cable and a computing device (e.g., one or more processors) configured to control the cable preparation device to automatically cut the one or more layers of the electrical cable for coupling the electrical cable to a cable accessory (e.g., a cable splice body or a termination). In one example, the computing device accurately determines (e.g., measures) a relative position of a cutting tool based on a signal, such as a laser, reflected off a reflection target. In some examples, the computing device accurately determines a rotation angle of the cutting tool based on the signal reflected off the reflection target.

In this way, the computing device may enable a cable preparation device to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, and hence the decrease the probability and/or quantity of partial discharge events. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIGS. 2A and 2B are conceptual diagrams of a cable preparation device configured to prepare an electrical cable for installation to an electrical grid, in accordance with various techniques of this disclosure.

FIGS. 6A-6F are conceptual diagrams illustrating an example technique for operating an example tool head, in accordance with various techniques of this disclosure.

FIG. 7A perspective view of an example rotating tool head assembly for a cable preparation device, according to various techniques of this disclosure.

FIG. 7B is an exploded view of the example rotating tool head assembly of FIG. 7A.

Figure 1B:
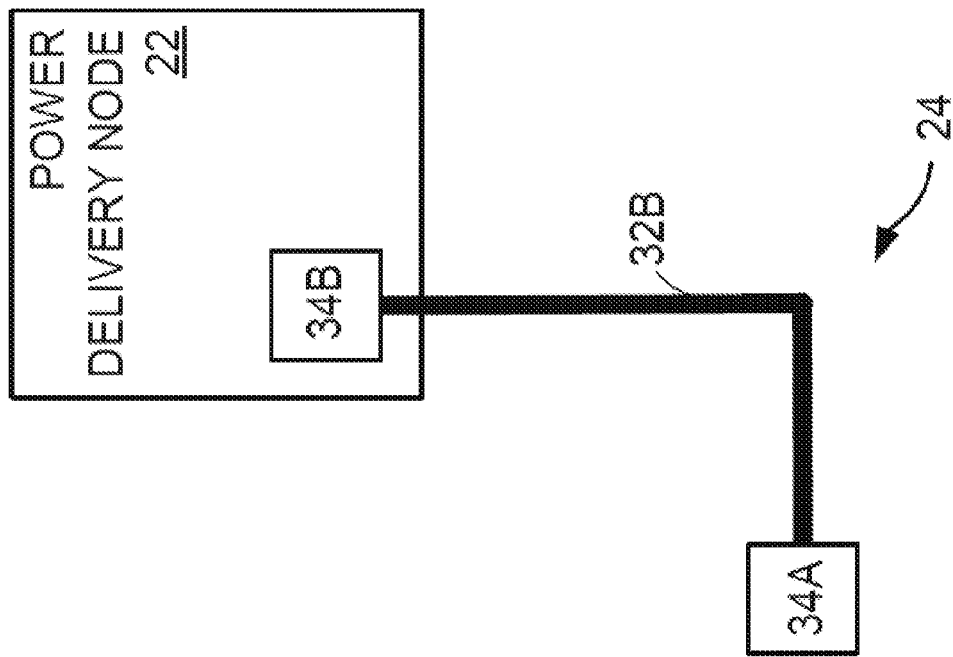
FIGS. 1A and 1B are conceptual diagrams illustrating an example system for preparing electrical cables for use within an electrical power grid, in accordance with various techniques of this disclosure.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In some examples in accordance with this disclosure, a system includes an electrical cable preparation device configured to cut at least one layer of an electrical cable. The electrical cable preparation device may include a rotatable tool head having a plurality of rollers and a cutting tool, such as a spring-loaded cutting tool, rigidly coupled to a signal reflection target. The system may also include a transceiver configured to transmit a signal, such as a laser or ultrasonic signal, toward the reflection target and detect a reflected signal from the reflection target. The system may also include a computing device configured determine, based on the reflected signal, a relative position of the cutting tool.

The relative position may indicate, for example, a distance between the cutting tool and one or more reference points. For example, the computing device may determine, based on the relative position of the cutting tool, a current radial depth of the cutting tool relative to a central axis of the rotatable tool head, or to a layer of the electrical cable. In some examples, the computing device may also be configured to receive user input indicating a target relative position of the cutting tool, and then determine whether the current relative position equals the target relative position. If the current relative position does not equal the target relative position the computing device may cause a driver to adjust and re-measure the current relative position in a feedback loop until the target relative position matches the current relative position.

In some examples, the computing device may also be configured to determine, based on the reflected signal, a relative rotation angle of the cutting tool, such as by determining a zero reference angle of the cutting tool, and then determining a change in rotation angle from the zero angle of the cutting tool. For example, the computing device may be configured to determine the zero angle of the cutting tool by causing the driver to rotate the cutting tool until the system detects an edge of the reflection target. For example, the system may detect the edge of the reflection target when the transceiver transitions between detecting the reflected signal and not detecting the reflected signal after an incremental change in rotational angle.

In some examples, the reflection target defines both a first edge and a second edge disposed at a fixed angle to the first edge, wherein the processor is configured to determine the zero angle of the cutting tool based on the reflected signal at the first edge, and the processor is further configured to determine a second rotation angle of the cutting tool based on the reflected signal at the second edge. For example, the reflection target may include a reflective metal triangle or wedge, defining at least two edges with a fixed angle between the edges. In some examples, the fixed angle may be between about 20 to 50 degrees, such as 30 degrees.

Figure 1A:
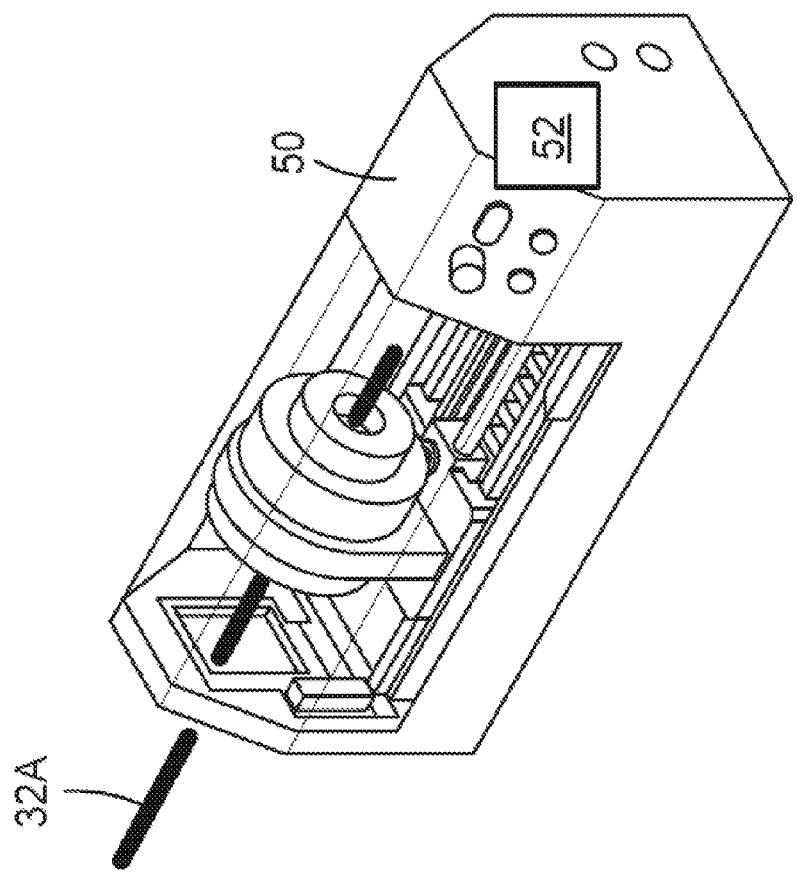

FIGS. 1A and 1B are conceptual diagrams illustrating an example system 2 for automatically preparing electrical cables for use within an electrical power grid. System 2 represents a physical environment in which one or more electrical power lines 24 provide power from a power source (e.g., power plant) to one or more consumers (e.g., businesses, homes, government facilities, etc.). System 2 includes a plurality of articles of electrical equipment, such as one or more power delivery nodes 22, one or more power lines 24, and one or more cable preparation devices 50. Power delivery nodes 22 may include one or more input lines to receive power (e.g., directly from a power source or indirectly via another power delivery node 22) and one or more output lines to directly or indirectly (e.g., via another power delivery node 22) distribute power to consumers (e.g., homes, businesses, etc.). Power delivery nodes 22 may include a transformer to step voltages up or down. In some examples, power delivery node 22 may be a relatively small node to distribute power to homes in a neighborhood, such as an electrical cabinet, pole-mount transformer, or pad-mount transformer. As another example, power delivery node 22 may be a relatively large node (e.g., a transmission substation) that distributes power to other power delivery nodes (e.g., distribution substations), such that the other power delivery nodes further distribute power to consumers (e.g., homes, businesses, etc.).

Power lines 24 may transmit electrical power from a power source (e.g., a power plant) to a power consumer, such as a business or home. Power lines 24 may be underground, underwater, or suspended overhead (e.g., from wooden poles, metal structures, etc.). Power lines 24 may be used for electrical power transmission at relatively high voltages (e.g., compared to electrical cables utilized within a home, which may transmit electrical power between approximately 12 volts and approximately 240 volts depending on application and geographic region). For example, power lines 24 may transmit electrical power above approximately 600 volts (e.g., between approximately 600 volts and approximately 1,000 volts). However, it should be understood that power lines 24 may transmit electrical power over any voltage and/or frequency range. For example, lines 24 may transmit electrical power within different voltage ranges. In some examples, a first type of lines 24 may transmit voltages of more than approximately 1,000 volts, such as for distributing power between a residential or small commercial customer and a power source (e.g., power utility). As another example, a second type of lines 24 may transmit voltages between approximately 1 kV and approximately 69 kV, such as for distributing power to urban and rural communities. A third type of lines 24 may transmit voltages greater than approximately 69 kV, such as for sub-transmission and transmission of bulk quantities of electric power and connection to very large consumers.

Power lines 24 include electrical cables 32-32B (collectively, electrical cables 32) and one or more electrical cable accessories 34A-34B (collectively, cable accessories 34). Electrical cables 32 may also be referred to as electrical power cables, power cables, or cables. Each electrical cable 32 includes a conductor which may be radially surrounded by one or more layers of insulation. In some examples, electrical cables 32 include a plurality of stranded conductors (e.g., a three-phase or multi-conductor cable). Example cable accessories 34 may include splices, separable connectors, terminations, and connectors, among others. In some examples, cable accessories 34 may include cable splices configured to couple (e.g., electrically and physically) two or more electrical cables 32. For example, cable accessory 34A is configured to electrically and physically couple cable 32A to cable 32B. In some examples, terminations may be configured to couple (e.g., electrically and physically) a cable 32 to additional electrical equipment, such as a transformer, switch gear, power substation, business, home, or other structure. For example, cable accessory 34B electrically and physically couples cable 32B to power delivery node 22 (e.g., to a transformer of the power delivery node 22).

Cable preparation device 50 is configured to automatically cut one or more layers of electrical cable 32A to prepare electrical cable 32A for coupling to a cable accessory (e.g., cable accessory 34A). Cable preparation device 50 may be configured to automatically remove various layers (e.g., a cable jacket layer, a shield layer, an insulation layer, an insulation screen layer, a conductor screen layer, or other layers) of electrical cable 32A as the layers are cut. For example, as illustrated and described in later figures, cable preparation device 50 may include one or more cutting tools (e.g., knife blades, saws, etc.) that are configured to cut the various layers of electrical cable 32A.

According to techniques of this disclosure, system 2 includes a cable preparation device 50 configured to remove one or more layers of an electrical cable 32A. Cable preparation device 50 may more efficiently and accurately prepare electrical cables 32A for installation within a power line of a power grid, compared to existing techniques. In some examples, cable preparation device 50 includes a rotatable tool head. In some examples, the tool head includes one or more cutting tools which may be configured to perform different types of cuts (e.g., scoring cuts, shaving cuts, through cuts) in different directions (e.g., longitudinally, radially, circumferentially) to cut, and optionally remove, various layers of electrical cable 32A. In one example, the tool head includes a plurality of rollers configured to support electrical cable 32A while one or more cutting tools of the tool head cut the various layers.

Cable preparation device 50 includes a computing device 52 configured to control operation of the cable preparation device 50. In some examples, computing device 52 controls cable preparation device 50 to adjust various components of cable preparation device 50 to cut the various layers of electrical cable 32A.

In some examples, computing device 52 outputs various commands to control the starting position of the cutting tools and a cutting distance (e.g., a cutting depth or cutback length) of the cutting tools. In one example, computing device 52 causes the tool head to start cutting at one end of electrical cable 32A. In another example, computing device 52 causes the tool head to start cutting a pre-determined distance from the end of the electrical cable 32A to create a retention band of one or more layers of electrical cable 32A. The retention band may prevent one or more layers of electrical cable 32A from moving or becoming loose while the tool head cuts the layers of electrical cable 32A.

In some scenarios, computing device 52 outputs commands to remove one or more layers of electrical cable 32A. In one example, a command causes a cutting tool to penetrate to a particular depth of electrical cable 32A to create a tab. Another command causes the cutting tool to partially retract the cutting tool (e.g., to a shallower cutting depth) such that the cutting tool may remove one or more exterior layers of electrical cable 32A without cutting one or more interior layers of electrical cable 32A.

In some examples, computing device 52 outputs a command causing a positioning driver of cable preparation device 50 to adjust a relative position of the one or more cutting tools. For example, the positioning driver may increase or decrease a radial depth of a cutting tool relative to a central longitudinal axis of the preparation device 50. Additionally, computing device 52 may output a command causing a transceiver to transmit a signal toward a signal reflection target coupled to the cutting tool, and accurately determine (e.g., measure), based on the reflection of the signal, the relative position of the cutting tool. For example, the relative position of the cutting tool may indicate, for example, relative to the central longitudinal axis of the cable preparation device 50. In some examples, the relative position of the cutting tool may indicate a distance between the cutting tool and one or more layers or surfaces of the electrical cable. For example, computing device 52 may be configured to determine a diameter of an electrical cable placed within the cable preparation device 50, such that a distance between the cutting tool and the cable may be determined as the difference between the distance between the cutting tool and the central axis and the distance between the outer surface of the cable and the central axis.

In some examples, computing device 52 determines (e.g., measures) a rotational angle of the cutting tool by causing the positioning driver to rotate the cutting tool until the transceiver either starts or stops detecting the signal reflected off of the underside of the signal reflection target. The computing device 52 may then use this identified zero angle as a reference to calibrate any further measurements of the rotational angle of the cutting tool.

In this way, computing device 52 may enable cable preparation device 50 to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, decrease the probability and/or quantity of partial discharge events, or both. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

The examples described herein are discussed with respect to computing device 52 for purposes of example. It is understood that the functions described may be implemented by any computing device. Moreover, the term computing device is used to refer to any computing platform having one or more processors that provide an execution environment of programmable instructions. For example, a computing device 52 may be one or more computers (e.g., servers, desktops, laptops, blade computers, virtual machines or the like) coupled to or otherwise in communication with a cable preparation device 50. As other examples, a computing device 52 may be one or more processors embedded within a cable preparation device 50.

FIGS. 2A and 2B are conceptual diagrams of a cable preparation device 50 configured to prepare an electrical cable 350 for installation to an electrical grid, in accordance with various techniques of this disclosure. Electrical cable 350 may be an example of electrical cables 32 illustrated in FIGS. 1A and 1B.

In the example of FIG. 2A, electrical cable 350 includes a plurality of concentric (e.g., cylindrical) layers, such as central conductor 352, conductor screen 354, insulation 356, insulation screen 358, shield 360 (also referred to as sheath 360), and jacket 362. However, in some examples, electrical cable 350 may include more or fewer layers. It should be understood that the layers of cable 350 are not necessarily drawn to scale. Electrical cable 350 may be configured for AC and/or DC power transmission.

Electrical cable 350 may transmit voltages of 11 kV, 33 kV, 66 kV, 360 kV, as a few example voltages. In some instances, electrical cable 350 transmit electrical power between a power source and substation may transmit voltages of 360 kV or more, which may be considered a "transmission level voltage". In some examples, electrical cable 350 transmit voltages between 33 kV and 360 kV, such as 66 kV or 33 kV, which may be considered "subtransmission-level voltages," and may provide electrical power from a power source to an end-user or customer (e.g., customers utilizing a relatively large amount of power). As another example, electrical cable 350 that transmit electrical power between a distribution substation and a distribution transformer may transmit voltages less than 33 kV, which may be considered "distribution-level voltages." Electrical cable 350 may also transmit electrical power between a distribution substation or distribution transformer (e.g., a pad-mount transformer or pole-mount transformer) and end-users or consumers (e.g., homes and businesses) and may transmit voltages between 360 volts and 240 volts, at such voltages electrical cable 350 may be called "secondary distribution lines."

Central conductor 352 includes a conductive material, such as copper or aluminum. In some examples, central conductor 352 includes a single solid conductor or a plurality of stranded conductors. A diameter or thickness of the central conductor 352 is based on the current that electrical cable 350 is designed to transmit or conduct. In other words, the cross-sectional area of central conductor 352 is based on the current that electrical cable 350 are designed to transmit. For example, central conductor 352 may be configured to transmit currents of 1,000 amperes or more.

Conductor screen 354 may include a semi-conductive polymer, such as carbon black loaded polymer. The semi-conductive polymer may have a bulk resistivity in a range from approximately 5 to approximately 100 ohm-cm. Conductor screen 354 may be physically and electrically coupled to central conductor 352. In the example of FIG. 2, conductor screen 354 is disposed between central conductor 352 and insulation 356. Conductor screen 354 may provide a continuous conductive surface around the exterior of central conductor 352, which may reduce or eliminate sparking that might otherwise be created by central conductor 352.

In some examples, insulation 356 includes polyethylene, such as a cross-linked polyethylene (which may be abbreviated as PEX, XPE, or XLPE) or an ethylene propylene rubber (which may be abbreviated as EPR). A diameter or thickness of the insulation 356 is based on the voltage that electrical cable 350 is designed to transmit or conduct.

Insulation screen 358 may include a semi-conductive polymer similar to conductor screen 354. Insulation screen 358 is disposed between insulation 356 and shield 360. Insulation screen 358 may be coupled to insulation 356. In some examples, insulation screen 358 is electrically coupled to shield 360

Shield 360 may include a conductive material, such as a metal foil or film or wires. In some examples, shield 360 may be referred to as a "earth ground conductor."

Jacket 362, also referred to as an "oversheath," is an outer layer of electrical cable 350. Jacket 362 may be a plastic or rubber polymer, such as polyvinyl chloride (PVC), polyethylene (PE), or ethylene propylene diene monomer (EPDM).

Electrical cable 350 may include additional layers, such as a swellable or water blocking material placed within the conductor strands (e.g., a strand fill) or between various layers within electrical cable 350.

According to aspects of this disclosure, cable preparation device 50 includes computing device 52. In some examples, computing device 52 includes at least one processor 302, a communication unit 304, a power source 306, one or more sensors 308, a storage device 310, and an electrical driver 322. FIG. 2B illustrates one example of a cable preparation device 50 and computing device 52. Many other examples of computing device 52 may be used in other instances and may include a subset of the components included in example computing device 52 or may include additional components not shown in the example of FIG. 2B.

Computing device 52 includes one or more power sources 306 to provide power to components shown in computing device 52. In some examples, power sources 306 include a primary power source to provide electrical power and a secondary, backup power source to provide electrical power if the primary power source is unavailable (e.g., fails or is otherwise not providing power). In some examples, power source 306 includes a battery, such as a lithium ion battery.

One or more processors 302 may implement functionality and/or execute instructions within computing device 52. For example, processors 302 may receive and execute instructions stored by storage device 310. These instructions executed by processors 302 may cause computing device 52 to store and/or modify information, within storage devices 310 during program execution. Processors 302 may execute instructions of components, control module 320, to perform one or more operations in accordance with techniques of this disclosure. That is, control module 320 may be operable by processor 302 to perform various functions described herein.

One or more communication units 304 of computing device 52 may communicate with external devices by transmitting and/or receiving data. For example, computing device 52 may use communication units 304 to transmit and/or receive radio signals on a radio network such as a cellular radio network. Examples of communication units 304 include a network interface card (e.g. such as an Ethernet card), an optical transceiver, a radio frequency transceiver, or any other type of device that can send and/or receive information. Other examples of communication units 304 may include Bluetooth®, cellular (e.g., 3G, 4G), LPWAN, and Wi-Fi® radios. As another example, communications unit 304 may communicate with external devices by transmitting and/or receiving data via wired communication.

Computing device 52 may include one or more sensors 308. In one example, sensors 308 include one or more positions sensor to detect the position of various components of cable preparation device 50 (e.g., the position of a tool head, rollers, or cutting tools, among others). In another example, sensors 308 may include one or more velocity sensors configured to measure the velocity of various components of cable preparation device 50.

Sensors 308 may include one or more imaging devices, such as a camera or barcode scanner. For example, computing device 52 may include a plurality of cameras configured to take images of electrical cable 350 during and/or after the layers of electrical cable 350 are cut.

One or more storage devices 310 may store information for processing by processors 302. In some examples, storage device 310 is a temporary memory, meaning that a primary purpose of storage device 310 is not long-term storage. Storage device 310 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage device 310 may, in some examples, also include one or more computer-readable storage media. Storage device 310 may be configured to store larger amounts of information than volatile memory. Storage device 310 may further be configured for long-term storage of information as non-volatile memory space and retain information after activate/off cycles. Examples of non-volatile memories include, solid state drives (SSDs), magnetic storage hard disk drives (HDDs), flash memories, or forms of electrically programmable memories (EPROM) or electrically erasable and programmable (EEPROM) memories. Storage device 310 may store program instructions and/or data associated with components such as control module 320.

Storage devices 310 include electrical equipment data repository 312. Data repository 312 may include relational databases, multi-dimensional databases, maps, and hash tables, or any data structure that stores data. In some examples, electrical equipment data repository 312 includes device or equipment data, manufacturing data, installation data, consumer data, power distribution data, among others.

For example, electrical equipment data repository 312 may include, for each cable accessory of cable accessories 34, data identifying a date of manufacture, a date of installation, a location (e.g., GPS coordinates, street address, etc.), entity that installed the cable accessory, a unique identifier (e.g., serial number), a type of cable accessory, etc. As another example, electrical equipment data repository 312 may include data indicating cutting dimensions for various types of electrical cables and/or cable accessories.

According to aspects of this disclosure, control module 320 may be operable by one or more processors 302 to functionality of computing device 52 as described herein. For example, control module 320 may output commands (e.g., one or more signals via wired or wireless communication and receivable by cable preparation device 50) to control operation of the cable preparation device 50. In some examples, control module 320 controls cable preparation device 50 to adjust various components of cable preparation device 50 to cut the various layers of electrical cable 350. In one example, control module 320 outputs a command causing cable preparation device 50 to measure a relative position of a cutting tool of cable preparation device 50. For example, control module 320 may cause a transceiver (e.g., one or more devices having signal transmission and reception capabilities) to transmit a signal (e.g., a laser or ultrasonic signal) toward the cutting tool and detect a signal reflected off of the cutting tool. Based on the reflected signal, processor(s) 302 may determine a distance between the transceiver and the cutting tool. Based on the distance between the cutting tool and the transceiver, and based on a known (e.g., fixed) distance between the central longitudinal axis 1210 and the transceiver, processor(s) 302 may determine a distance (e.g., radial depth) between the cutting tool and the central longitudinal axis 1210 of the cable preparation device 50. In some examples, control module 320 may cause a tool positioning driver to adjust a relative position of the cutting tool. For example, control module 320 may cause the driver to adjust the radial depth of the cutting tool until the measured radial depth matches a target radial depth as indicated by user input.

In some examples, control module 320 outputs a command causing cable preparation device 50 to measure a rotation angle of the cutting tool of tool head 1018. For example, control module 320 may cause the transceiver to transmit a signal toward at least a portion of the cutting tool of tool head 1018. Based on the relative rotation angle of the cutting tool, the transmitted signal may or may not reflect off of a signal reflection target coupled to the cutting tool. Control module 320 may adjust (e.g., rotate) the relative rotation angle of the cutting tool until the transceiver identifies an edge of the signal reflection target, e.g., when the signal is first reflected back toward the transceiver. When the edge of the signal reflection target is oriented directly over the transceiver, processor 302 may determine that the cutting tool is currently oriented at a zero reference angle, which may be used to calibrate any further measurements of the rotation angle of the cutting tool.

In some examples, control module 320 outputs various commands to control the starting position of the cutting tools and a cutting distance (e.g., a cutting depth or cutback length) of the cutting tools. For example, control module 320 may cause the tool head to start cutting at one end of electrical cable 350. In another example, control module 320 may cause the tool head to start cutting a pre-determined distance from the end of the electrical cable 350 to create a retention band of one or more layers of electrical cable 350. The retention band may prevent one or more layers of electrical cable 350 from moving or becoming loose while the tool head cuts the layers of electrical cable 350.

In some scenarios, control module 320 outputs commands to remove one or more layers of electrical cable 350. In one example, a command causes a cutting tool to penetrate to a particular depth of electrical cable 350 to create a tab. Another command causes the cutting tool to partially retract the cutting tool (e.g., to a shallower cutting depth) such that the cutting tool may remove one or more exterior layers of electrical cable 350 without cutting one or more interior layers of electrical cable 350.

Electrical driver 322 may control characteristics of electrical power supplied to various components of cable preparation device 50. Example components of cable preparation device 50 include motors and/or actuators that drive a tool head or tool positioning driver, among others. Example characteristics of the electrical power include voltage, current, and/or frequency. In one example, electrical driver 322 outputs a command to a power converter to control the characteristics of the electrical power. In another example, electrical driver 322 includes a power converter to control the characteristics of the electrical power.

Figure 3A:
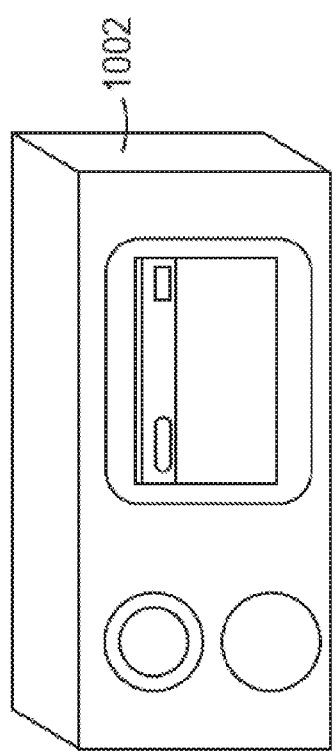
FIGS. 3A and 3B are conceptual diagrams of an example cable preparation device, in accordance with various techniques of this disclosure.
Figure 3B:
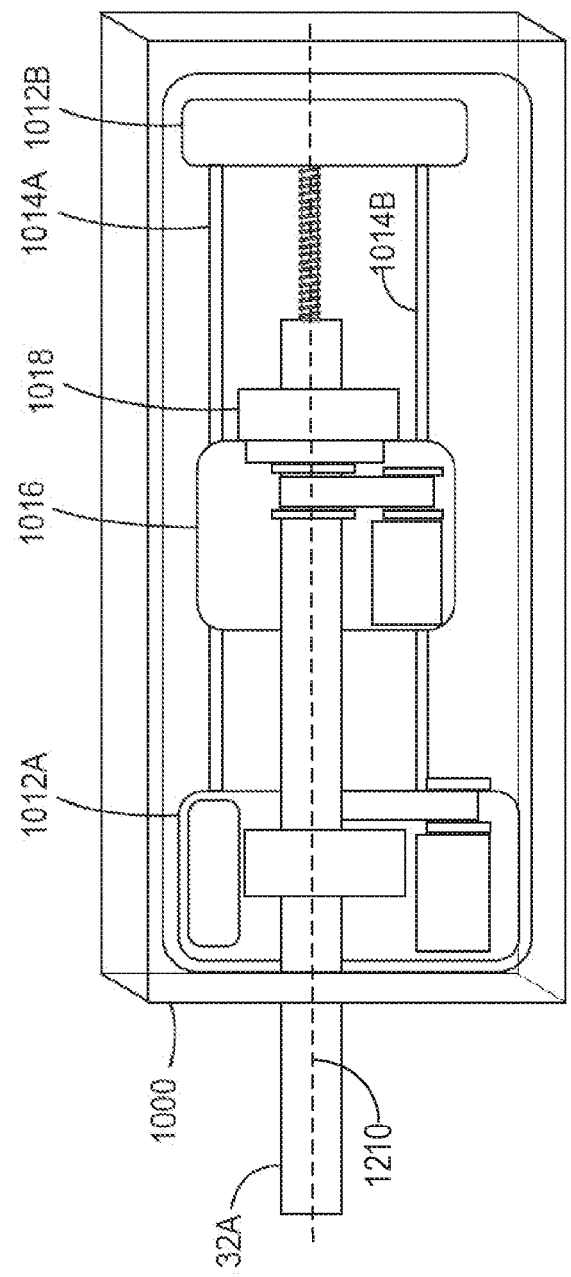

FIGS. 3A and 3B are conceptual diagrams illustrating an example cable preparation device 1000, in accordance with various techniques of this disclosure. Cable preparation device 1000 is an example of cable preparation device 50 of FIGS. 1A and 2B. Cable preparation device 1000 includes computing device 1002. Computing device 1002 may be configured to perform the functionality of computing device 52 described with reference to FIGS. 1A and 2B.

In some examples, cable preparation device 1000 includes base 1012A and 1012B (collectively, bases 1012). Bases 1012 are coupled via linear slides 1014A and 1014B (collectively, linear slides 1014). Linear slides 1014 may also be referred to as slides 1014 or linear guide rails 1014. Cable preparation device 1000 includes moving base 1016 coupled to linear slides 1014. Moving base 1016 moves longitudinally or linearly along to linear slides 1014.

Cable preparation device 1000 includes tool head 1018 (also referred to as, cutting head 1018). Tool head 1018 is configured to rotate about electrical cable 32A. Tool head 1018 includes one or more cutting tools configured to cut at least one layer of electrical cable 32A (e.g., as tool head 1018 rotates about electrical cable 32A).

Computing device 1002 may be configured to control one or more components of cable preparation device 1000. In one example, computing device 1002 outputs a command causing cable preparation device 1000 to adjust a depth of the plurality of rollers, which may enable the tool head to support electrical cable 32A as the cutting tools cut the various layers of electrical cable 32A.

In some examples, computing device 1002 outputs various commands to control the starting position of the cutting tools and a cutting distance (e.g., a cutting depth or cutback length) of the cutting tools. For example, computing device 1002 may output a command to cause tool head 1018 to move longitudinally along linear rails 1014 to position the tool head at a starting position for cutting electrical cable 32A. In one example, the command causes tool head 1018 to move to the end of electrical cable 32A before cutting electrical cable 32A. In another example, computing device 1002 causes tool head 1018 to move to a position located a pre-determined distance from the end of the electrical cable 32A prior to cutting electrical cable 32A. Starting the cut a pre-determined distance from the end of electrical cable 32A may enable tool head 1018 to create a retention band of one or more layers of electrical cable 32A. The retention band may prevent one or more layers of electrical cable 32A from moving or becoming loose while the tool head cuts the layers of electrical cable 32A.

In some scenarios, computing device 1002 outputs commands to remove one or more layers of electrical cable 32A. In one example, a command causes a cutting tool to penetrate to a particular depth of electrical cable 32A to create a tab. Another command causes the cutting tool to partially retract the cutting tool (e.g., to a shallower cutting depth) such that the cutting tool of tool head 1018 may remove one or more exterior layers of electrical cable 32A without cutting one or more interior layers of electrical cable 32A.

In some scenarios, computing device 1002 outputs commands in order to accurately measure a radial depth (e.g., distance) between the cutting tool of tool head 1018 and the central longitudinal axis 1210 of the device 1000. For example, computing device 1002 may output commands causing a transceiver to transmit a signal (e.g., a laser or ultrasonic signal) toward the cutting tool of tool head 1018 and detect a signal reflected off of the cutting tool (e.g., off of a reflection target coupled to the cutting tool). Based on the reflected signal, computing device 1002 may determine a distance between the transceiver and the cutting tool, and accordingly, a distance between the cutting tool and the central axis 1210. In some examples, computing device 1002 may cause a tool positioning driver to adjust a relative position of the cutting tool. For example, computing device 1002 may cause the driver to adjust the radial depth of the cutting tool until the measured radial depth matches a target radial depth as indicated by user input.

In some examples, computing device 1002 outputs a command causing cable preparation device 50 to measure a rotation angle of the cutting tool of tool head 1018. For example, computing device 1002 may cause the transceiver to transmit a signal toward at least a portion of the cutting tool of tool head 1018. Based on the relative rotation angle of the cutting tool, the transmitted signal may or may not reflect off of a signal reflection target coupled to the cutting tool. Computing device 1002 may cause the driver to adjust (e.g., rotate) the relative rotation angle of the cutting tool until the transceiver identifies (e.g., locates) an edge of the signal reflection target, wherein the signal is first reflected back toward the transceiver. When the edge of the signal reflection target is oriented directly over the transceiver, computing device 1002 may determine that the cutting tool is currently oriented at a zero reference angle, which may be used to calibrate any further measurements of the rotation angle of the cutting tool.

Figure 4B:
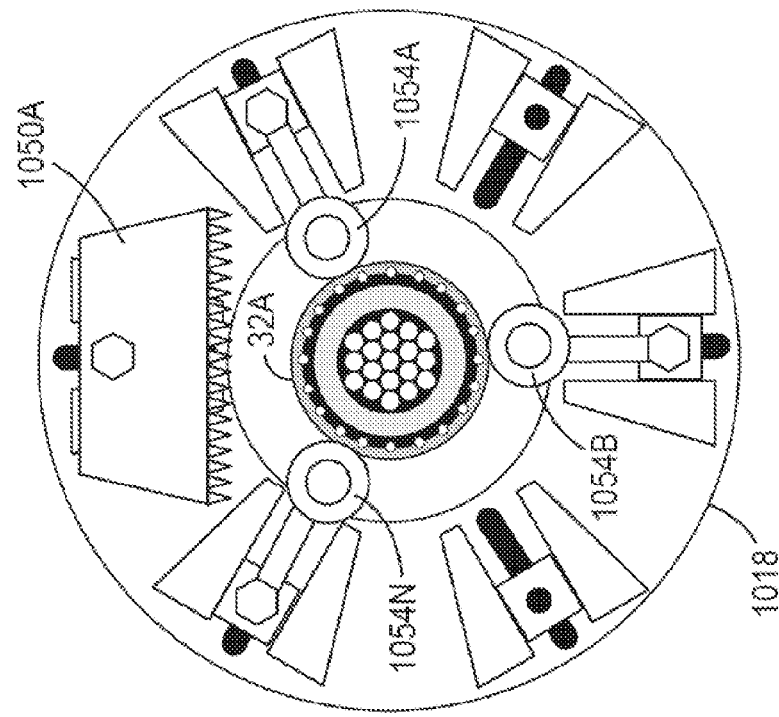
FIGS. 4A and 4B are conceptual diagrams illustrating details of an example tool head, in accordance with various techniques of this disclosure.
Figure 4A:
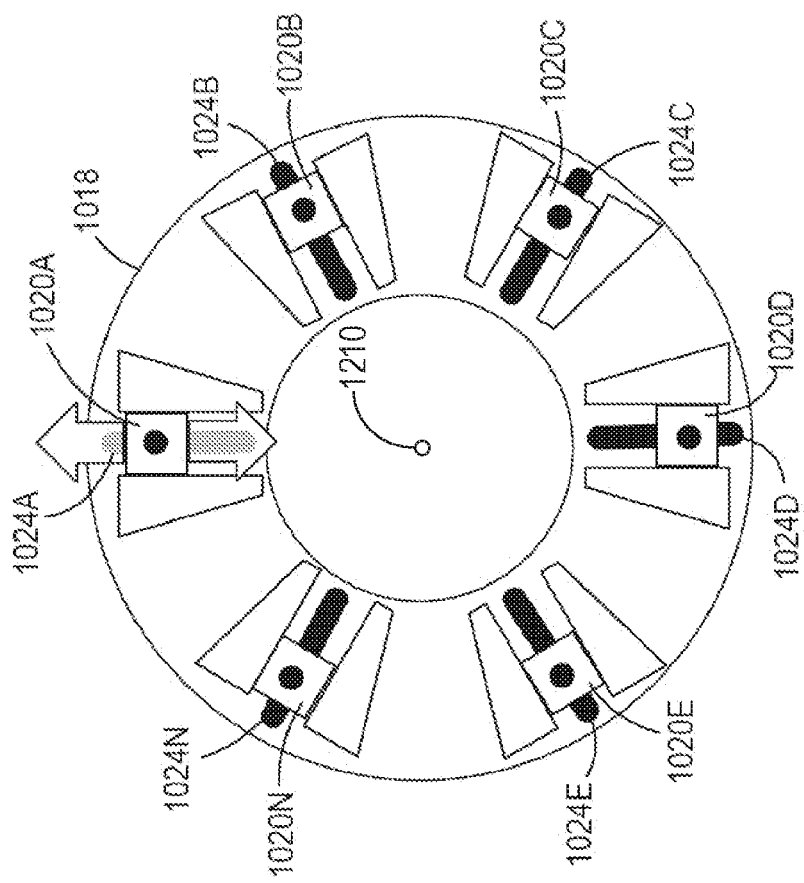

FIGS. 4A and 4B are conceptual diagrams illustrating details of an example tool head, in accordance with various techniques of this disclosure. As illustrated in FIG. 4A, tool head 1018 includes a plurality of slots 1024A-1024N (collectively, slots 1024) and a plurality of tool mounts 1020A-1020N (collectively, tool mounts 1020) configured to move radially along slots 1024 relative to a center axis of an electrical cable. In some examples, tool mounts 1020 (also referred to as slide mounts 1020) are spring loaded. Tool mounts 1020 may be configured to hold or couple one or tool head components (e.g., rollers and/or cutting tools) to move the tool head components radially. Examples of tool head components include guide rollers and cutting tools, among others.

As illustrated in FIG. 4B, tool head 1018 includes a plurality of guide rollers 1054A-1054N (collectively, guide rollers 1054 or rollers 1054) coupled to slide mounts 1020. In some instances, rollers 1054 may also be referred to as centering bearings 1054. In the example of FIG. 4B, rollers 1054 slide radially relative to the center axis of electrical cable 32A (e.g., radially inwards towards electrical cable 32A and radially outwards from electrical cable 32A). Tool head 1018 may move rollers 1054 radially inwards to contact electrical cable 32A, such that rollers 1054 may center electrical cable 32A relative to tool head 1018 while tool head 1018 rotates around electrical cable 32A. In some examples, rollers 1054 move symmetrically along respective tool mounts 1020. In other words, tool head 1018 may be configured such that radially moving roller 1054A simultaneously moves rollers 1054B and rollers 1054C. For example, rollers 1054 may be mechanically coupled to one another.

In the example of FIG. 4B, tool head 1018 includes cutting tool 1050A. Examples of cutting tools include knives, blades, saws, or any other type of tool configured to cut one or more layers of electrical cable 32A. For example, different knife blades may be implemented to create different types or depths of cuts into one or more layers of electrical cable 32A. In one example, cutting tool 1050A is positioned approximately 180 degrees (e.g., plus or minus 15 degrees) circumferentially from one of rollers 1054. (e.g., roller 1054B). In this way, when cutting tool 1050A is pressed against the electrical cable 32A, roller 1054B and cutting tool 1050A counterbalance one another such that the electrical cable 32A remains positioned in the center or approximately in the center of tool head 1018.

Figure 5:
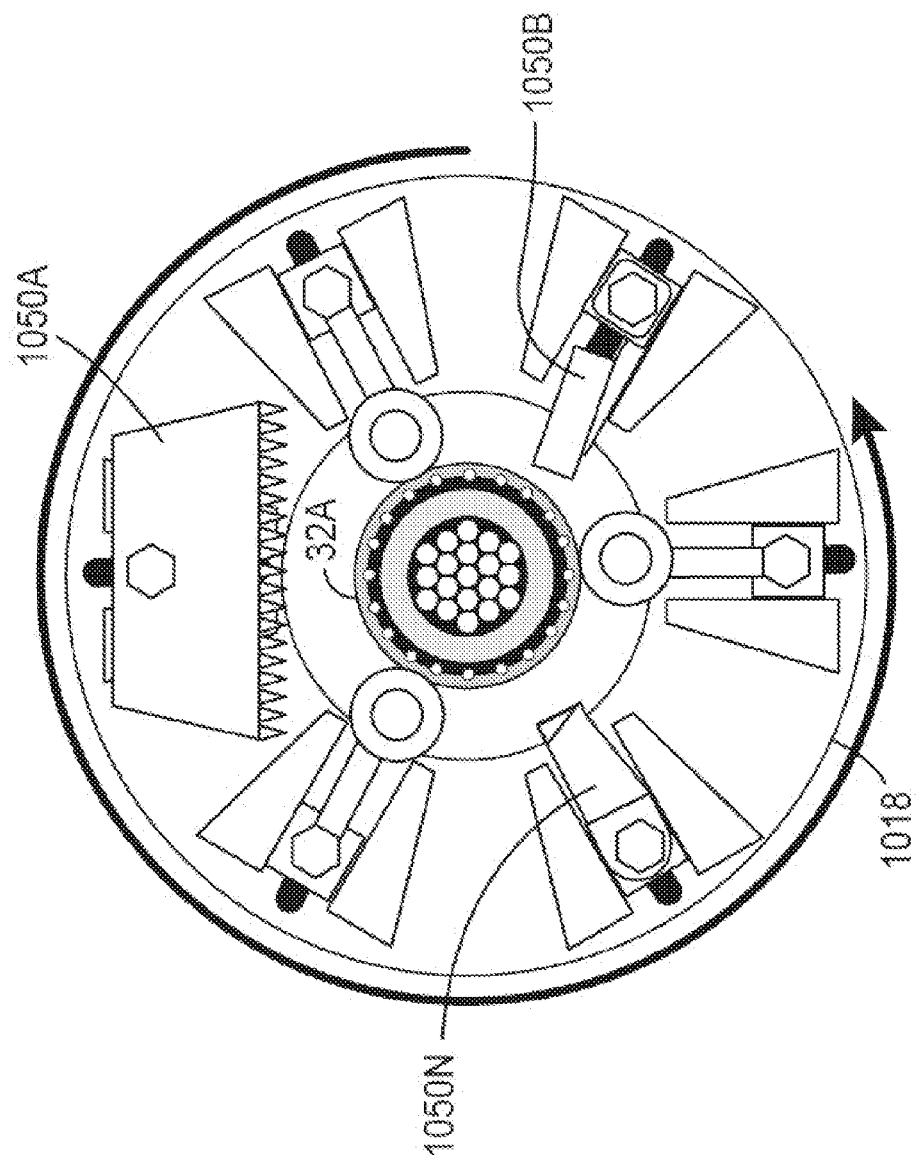
FIG. 5 is a conceptual diagram illustrating details of an example tool head, in accordance with various techniques of this disclosure.

FIG. 5 is a conceptual diagram illustrating details of an example tool head, in accordance with various techniques of this disclosure. Tool head 1018 includes a plurality of cutting tools 1050A-1050N (collectively, cutting tools 1050). In one example, each of cutting tools 1050 is positioned approximately 180 degrees (e.g., plus or minus 15 degrees) circumferentially from a respective roller of rollers 1054. In this way, when a cutting tool is pressed against the electrical cable, the roller 1054 and cutting tool 1050 counterbalance one another such that the electrical cable remains positioned in the center or approximately in the center of tool head 1018.

In one example, cutting tool 1050A is configured to cut through metal layers of electrical cable 32A, such as shield layer 360 illustrated in FIG. 2A. In some instances, cutting tool 1050A is configured to cut through all of the layers of electrical cable 32A. In other words, in such instances, cutting tool 1050A is configured to cut entirely through electrical cable 32A (e.g., in a single cut).

In another example, cutting tool 1050B is configured to make a shallow, shaving-type cut that is substantially tangent to an outer surface of an exposed layer of electrical cable 32 (e.g., in order to reduce a thickness of a portion of the exposed layer). Cutting tool 1050B may be configured to score an insulation layer or insulation screen (e.g., insulation 356 or insulation screen 358 as illustrated in FIG. 2A, respectively). As another example, cutting tool 1050B may be configured to cut a metal shield layer (e.g., a tape, a foil, a wire, etc.).

In one example, cutting tool 1050N is configured to cut and remove one or more layers of electrical cable 32A. For example, cutting tool 1050N may be configured to perform a spiral cut (also referred to as a helical cut) of jacket 362, insulation screen 358, insulation 356, or a combination thereof.

FIGS. 6A-6F are conceptual diagrams illustrating an example technique for operating an example tool head of cable preparation device 1000 (FIG. 3B). Cable preparation device 1000 includes a tool positioning driver 1026. Tool positioning driver 1026 may be configured to adjust a radial depth (also referred to as a radial position) of tool head components of tool head 1018. The radial depth may refer to the distance between the center axis of electrical cable 32A and a portion of the tool head component (e.g., a surface of a cutting tool or roller).

Figure 6B:
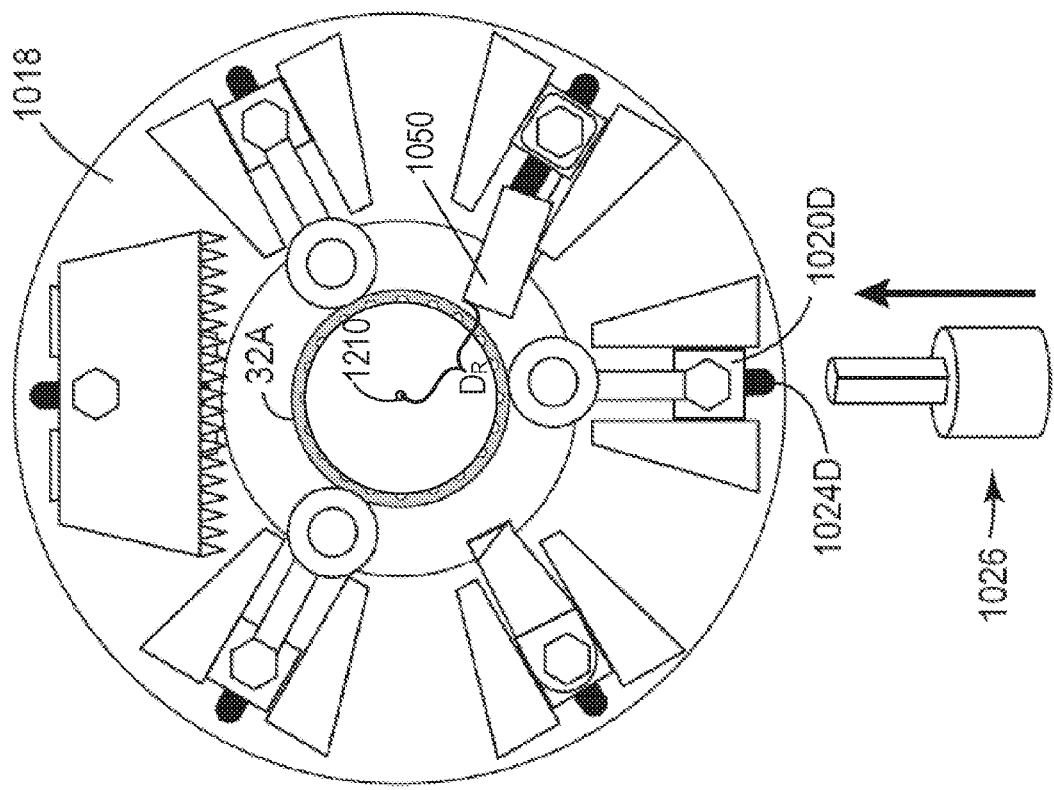
Figure 6A:
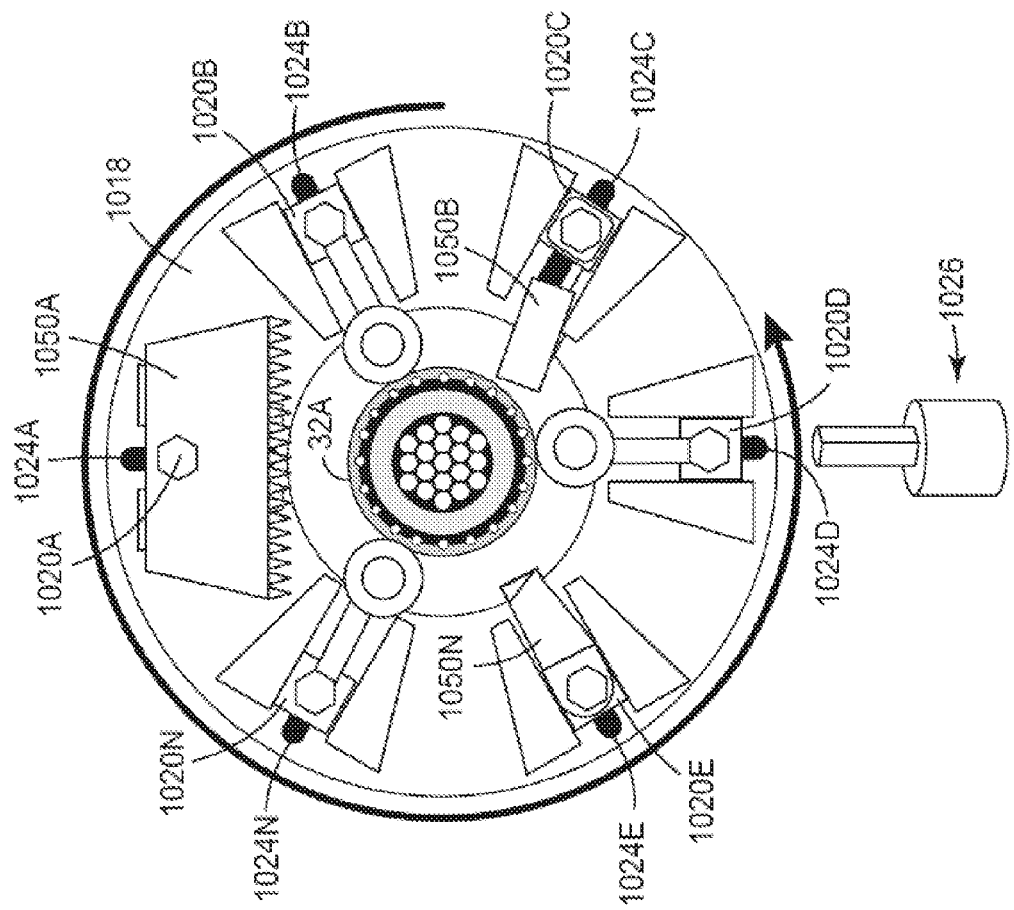

As illustrated in FIG. 6A, tool head 1018 rotates to align tool position driver 1026 with one of slots 1024 (e.g., slot 1024D). In the example of FIG. 6B, tool positioning driver 1026 extends or inserts into slot 1024D to engage with a tool mount (e.g., tool mount 1020D). In one example, tool mounts 1020 each include a recess (e.g., a slot, a torx socket, a hex socket, or any other type of recess) configured to receive tool positioning driver 1026. In some instances, tool positioning driver 1026 is actuated (e.g., inserted or retracted) via a solenoid, a cam shaft, a pneumatic piston, or other mechanism configured to adjust the radial depth of tool positioning driver 1026. In some examples the radial depth $D_R$ may be defined as a distance from the central longitudinal axis 1210 of rotatable cutting head 1018 to cutting tool 1050.

For example, as shown in FIG. 6B, tool positioning driver 1026 may be configured to adjust the radial depth $D_R$ between a cutting tool and the central axis 1210. In some examples in accordance with this disclosure, cable preparation device 1000 may be configured to accurately measure the radial depth $D_R$ of each cutting tool 1050, and accurately adjust the radial depth $D_R$ based on the measurements. For example, cable preparation device 1000 may include a transceiver configured to transmit a laser, ultrasonic signal, or other signal in order to accurately measure the radial depth $D_R$ of a respective cutting tool. Cable preparation device 1000 may be configured to cause tool positioning driver 1026 to adjust the radial depth $D_R$ of a respective tool 1050 until the measured radial depth matches (e.g., is equal to) a target or intended radial depth.

In some examples, such as the example of FIG. 6C, tool positioning driver 1026 rotates to adjust the radial depth of tool mount 1020D, and hence, roller 1054B attached to tool mount 1020D. For example, tool positioning driver 1026 may rotate (e.g., counter-clockwise) to push roller 1054B towards electrical cable 32. In one example, rollers 1054 are configured to move symmetrically. In other words, tool positioning driver 1026 may adjust a radial depth of each of rollers 1054 by adjusting a depth of tool mount 1020D attached to roller 1054B. In one example, tool positioning driver 1026 may push rollers 1054 to a predetermined radial depth (e.g., based on a type of electrical cable 32A). In another example, tool positioning driver 1026 may push rollers 1054 until the resistance or force against rollers 1054 or tool positioning driver 1026 satisfies (e.g., is greater than or equal to) a threshold resistance or force, or until the resistance or force is within a particular range of resistance or force. In one example, computing device 1002 determines whether rollers 1054 are at the proper radial depth to maintain electrical cable 32A in a proper cutting position (e.g., centered within tool head 1018). For example, computing device 1002 may receive sensor data indicative of a mechanical resistance or force experience by rollers 1054 or tool positioning driver 1026 and determine whether rollers 1054 are at the proper radial depth. In another example, computing device 1002 may receive sensor data indicative of the radial position of rollers 1054 to determine whether rollers 1054 are at the proper radial depth.

In some examples, computing device 1002 determines (e.g., measures) a relative position of cutting tool 1050 as a distance between cutting tool 1050 and one or more surfaces or layers of electrical cable 32A. For example, as described above, computing device 1002 may determine, based on a detected resistance or force, that one or more rollers 1054 is in physical contact with an outer surface of electrical cable 32A. As described above with respect to FIG. 6B, a transceiver or other measurement system may be configured to determine or otherwise measure a relative position of one or more rollers 1054 in physical contact with the outer surface of the electrical cable. Based on the relative position of the one or more rollers, computing device 1002 may determine an outer diameter or radius of electrical cable 32A. Based on both the radius of electrical cable 32A and the radial depth $D_R$ of cutting tool 1050 (described above with respect to FIG. 6B), computing device 1002 may determine a distance between cutting tool 1050 and the outer surface of electrical cable 32A. In examples in which the thickness of each layer of electrical cable 32A is known or measured (for example, based on imagery of the end surface of the cable), computing device 1002 may further determine a distance (e.g., a radial depth $D_R$) between cutting tool 1050 and each respective layer of cable 32A.

As shown in FIG. 6D, tool positioning driver 1026 may withdraw or be extracted from slot 1024D once rollers 1054 are at the proper depth (e.g., at the pre-determined depth, or when the resistance or force satisfies the threshold resistance or force).

Figure 6E:
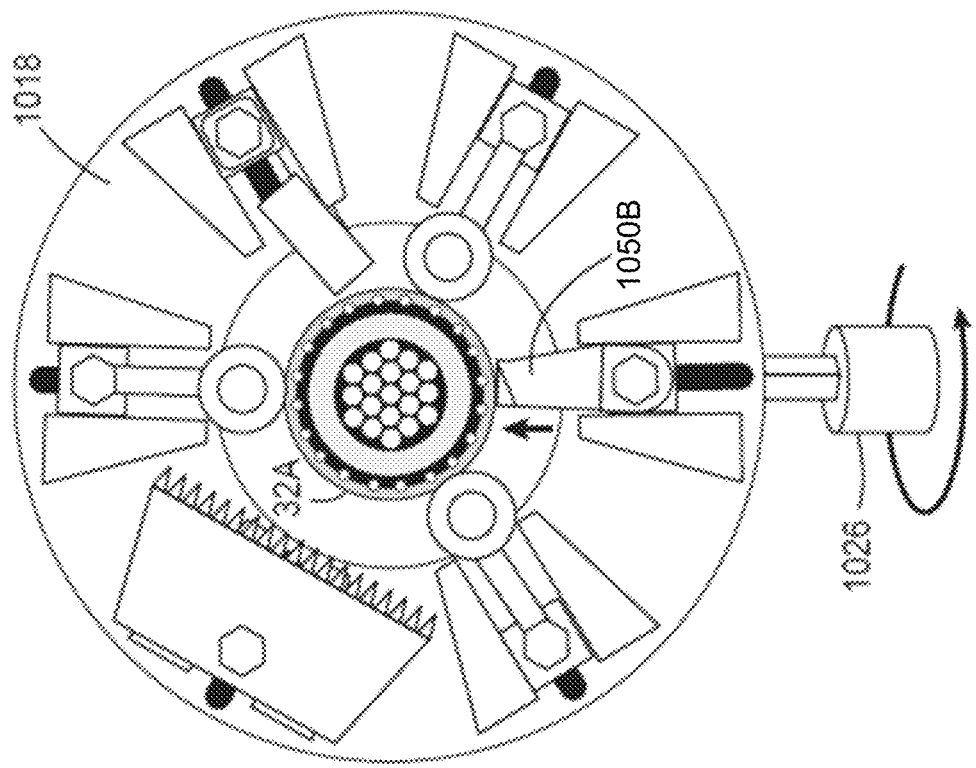

Tool head 1018 may rotate to align tool positioning driver 1026 with another slot (e.g., slot 1024E) after withdrawing tool positioning driver 1026 from slot 1024D, as illustrated by FIG. 6E. Tool positioning driver 1026 may insert into slot 1024E upon slots 1024E aligning with tool positioning driver 1026.

Figure 6F:
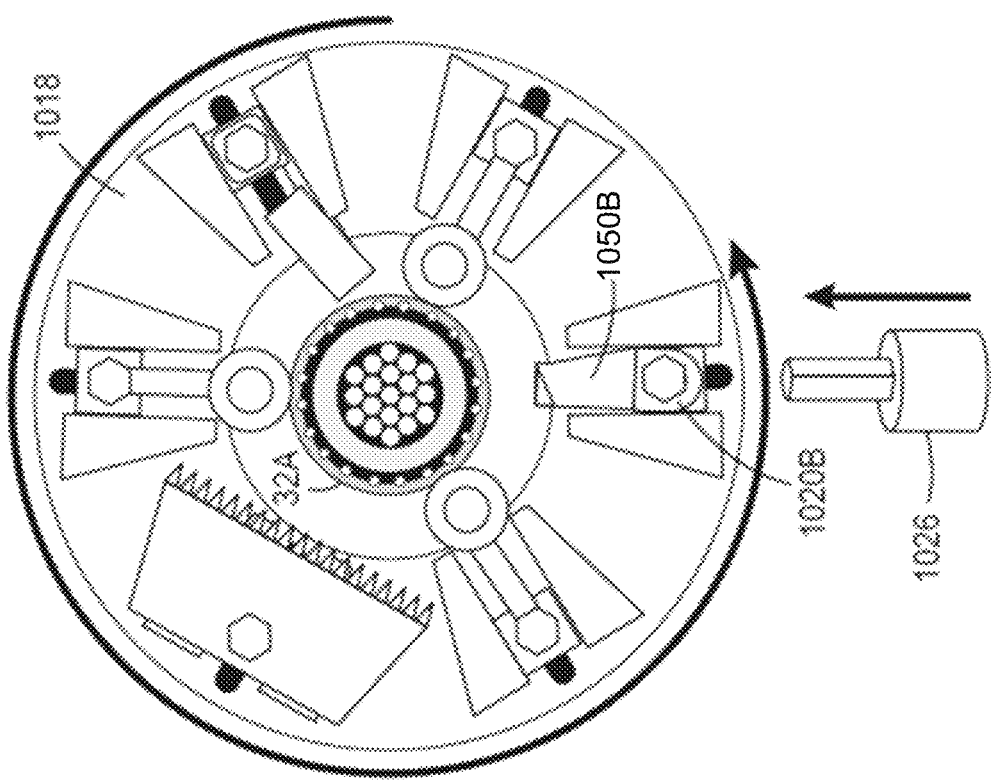

As shown in FIG. 6F, tool positioning driver 1026 may adjust a radial depth of tool mount 1020E and cutting tool 1050N coupled to tool mount 1020E. For example, tool positioning driver 1026 may engage a recess of tool mount 1020E and may rotate to adjust the radial depth (e.g., a target cutting depth) of tool mount 1020E. For example, tool positioning driver 1026 may push tool mount 1020E to a predetermined radial cutting depth (e.g., based on a type of electrical cable 32A) or until the resistance or force against cutting tool 1050N or tool positioning driver 1026 satisfies (e.g., is greater than or equal to) a threshold resistance or force. In one example, computing device 1002 determines whether the radial depth of cutting tool 1050N is the correct or proper depth. For example, computing device 1002 may determine whether the cutting tool 1050N is at the proper cutting depth based on sensor data. For instance, computing device 1002 may determine whether cutting tool 1050N is at the proper cutting depth (also referred to as the target cutting depth) based on sensor data indicative of a mechanical resistance experienced by cutting tool 1050N or tool positioning driver 1026. In another instance, computing device 1002 determines whether cutting tool 1050N is at the proper cutting depth based on sensor data indicative of electrical characteristics of cutting tool 1050N (e.g., an electrical resistance or capacitance or cutting tool 1050N). For instance, the electrical characteristics of cutting tool 1050N may change as cutting tool 1050N cuts through a jacket layer of electrical cable 32A and approaches and/or contacts shield layer. As yet another example, computing device 1002 may determine whether cutting tool 1050N is at the proper cutting depth based on images generated by an image sensor (e.g., a camera), ultrasonic sensor, or data from any other sensor.

In some examples, cable preparation device 1000 includes one or more clamps configured to move radially relative to the longitudinal axis of electrical cable 32A. The one or more clamps may be configured to restrict motion (e.g., rotational or longitudinal) of electrical cable 32A. In some examples, the clamps may enable blades pitched at an angle relative to the axis of the cable (e.g., to spiral cut a layer of the cable) to make a cut substantially perpendicular or normal to the axis of the cable.

In some examples, tool head 1018 of a cable preparation device (e.g., cable preparation device 50 described above in reference to FIG. 1A) includes a measurement system to accurately determine (e.g., measure) a relative position and/or a relative rotation angle of cutting tool 1050. For example, FIG. 7A is a perspective view, and FIG. 7B is an exploded view, of an example rotating tool head 1018 for a cable preparation device 50, according to various techniques of this disclosure. As shown in FIGS. 7A and 7B, rotating tool head 1018 includes cutting tool 1050, blade holder 1204, spring assembly 1160, and a signal reflection target 1202 rigidly coupled to cutting tool 1050.

Signal reflection target 1202 includes a reflective surface configured to reflect a transmitted signal toward a signal receiver (not shown). In the example shown in FIGS. 7A and 7B, reflection target 1202 includes a reflective metal wedge coupled to, but distinct from, cutting tool 1050. However, in other examples, reflection target 1202 may be integrally formed with cutting tool 1050. For example, cutting tool 1050 may be configured (e.g., oriented) to reflect the transmitted signal toward the signal receiver.

Figure 8:
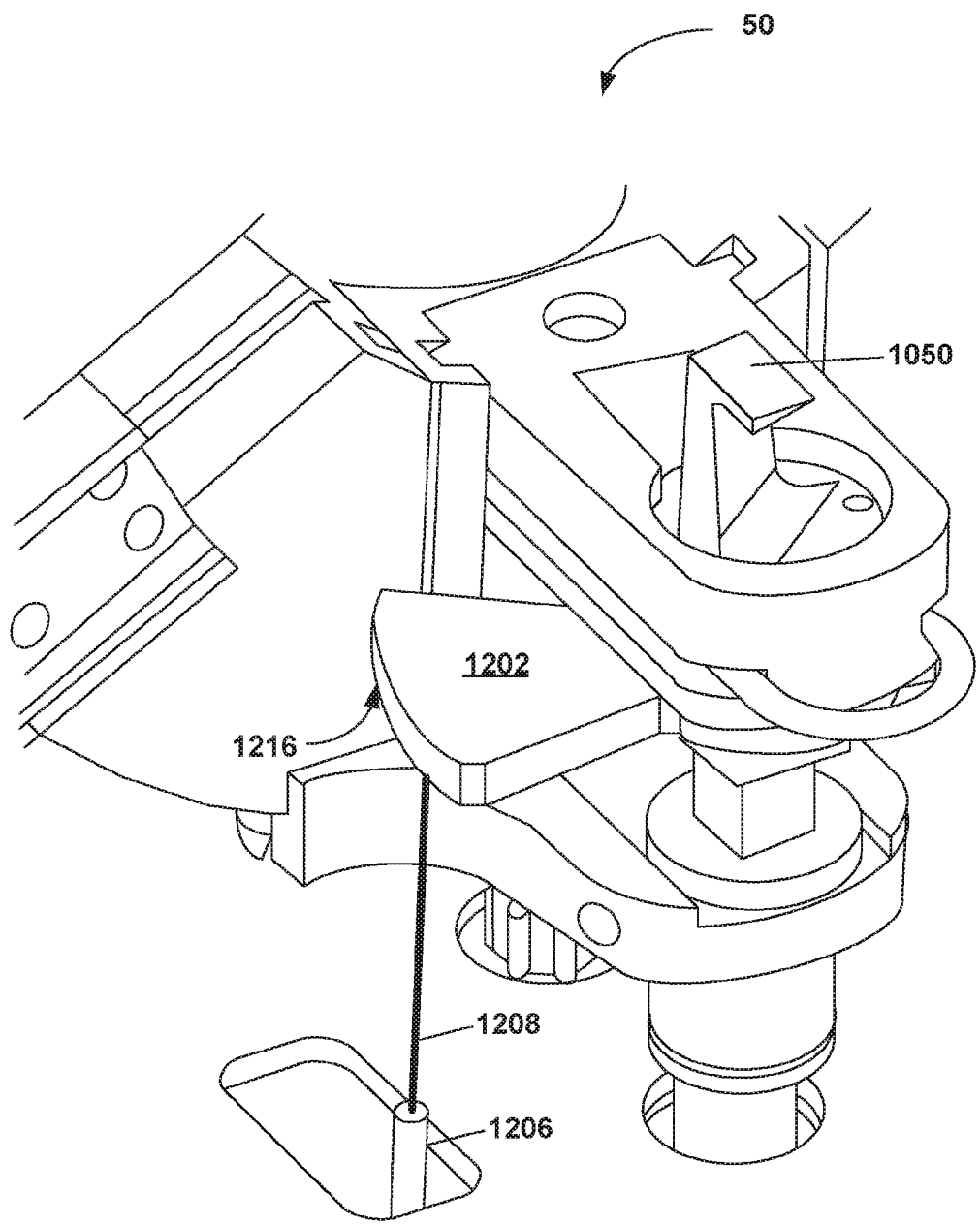
FIG. 8 is a perspective view of an example cable preparation device, according to various techniques of this disclosure.

Computing device 52 (e.g., processor 302 of FIG. 2B) may be configured to determine, based on a distance traveled by the reflected signal, a relative position of cutting tool 1050. For example, as shown in FIG. 8, cable preparation device 50 includes transceiver 1206. Although transceiver 1206 is described as including a signal transmitter and a signal receiver integrated within a single unit, in some examples, transceiver 1206 may include a separate transmitter configured to generate and transmit signal and a separate receiver configured to receive the transmitted signal for processing. Transceiver 1206 is configured to emit a transmitted signal 1208. For example, transmitted signal 1208 may include an electromagnetic signal, such as a laser. In other examples, transmitted signal 1208 may include a pressure-based signal, such as an ultrasonic signal.

In some examples, transceiver 1206 may be configured to transmit signal 1208 more or less continuously. In some examples, transceiver 1206 may be configured to automatically transmit signal 1208 at a certain frequency, for example, transmitting multiple discrete pulses of signals every second. In some examples, transceiver 1206 may be configured to transmit only a single discrete signal pulse in response to receiving instructions from computing device 52.

Figure 9:
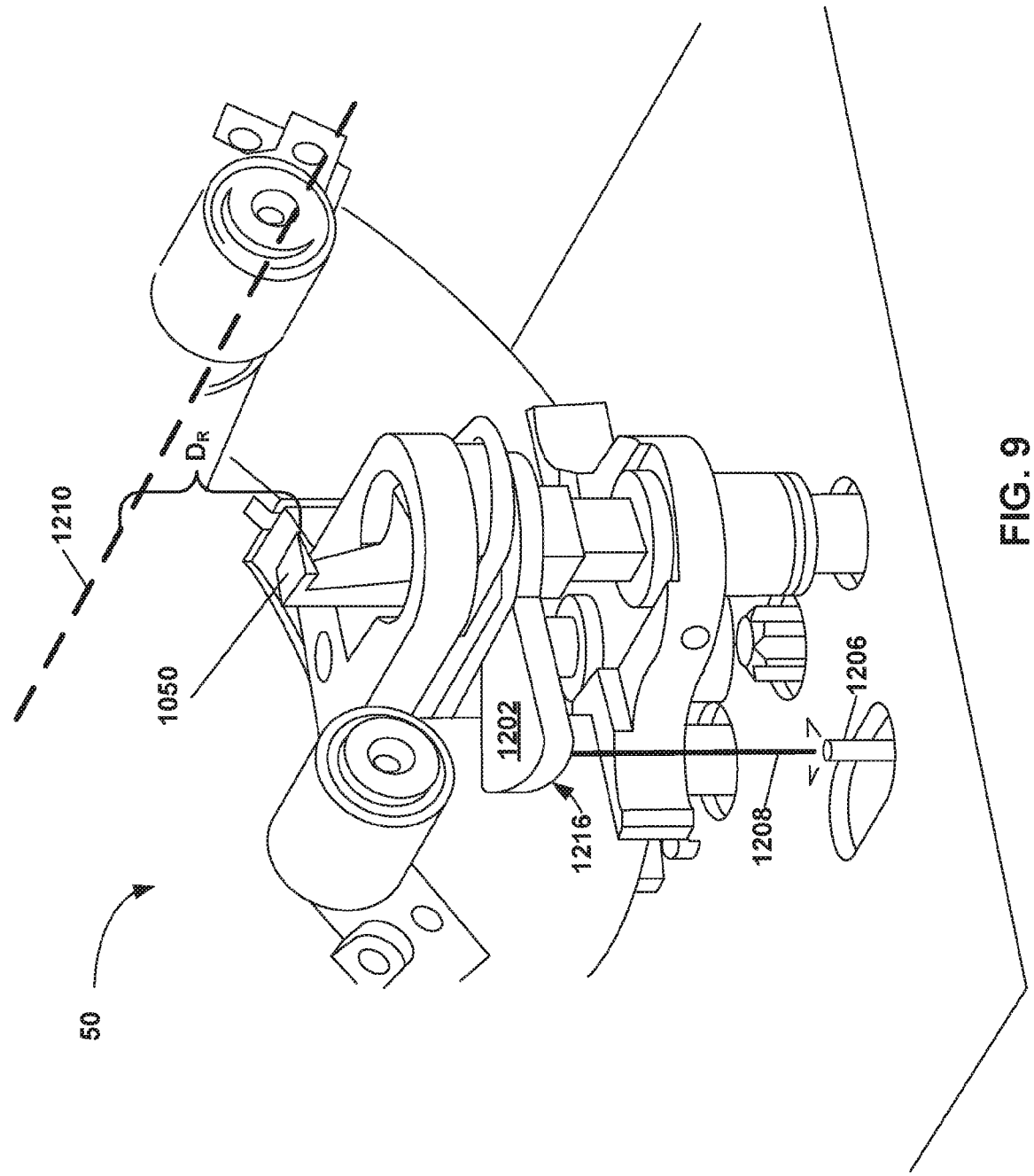
FIG. 9 is a perspective view of the example cable preparation device of FIG. 8.

Transceiver 1206 is configured to direct transmitted signal 1208 toward a reflective surface, such as an underside 1216 of signal reflection target 1202. Signal reflection target 1202 may be configured to reflect transmitted signal (e.g., a reflected signal) back toward transceiver 1206 or other signal-receiver device. Transceiver 1206 may be configured to output an indication of the received signal to computing device 52 (FIG. 2B). Computing device 52 may be configured to determine, based on a distance traveled by transmitted and/or reflected signal 1208, a current relative position of signal reflection target 1202 and cutting tool 1050. Computing device 52 may be configured to determine, based on a relative position of signal reflection target 1202, a position of cutting tool 1050 relative to transceiver 1206. For example, cutting tool 1050 may be rigidly coupled to signal reflection target 1202. For example, as shown in FIG. 9, the relative position may include a current radial depth $D_R$ of cutting tool 1050, such as a distance between cutting tool 1050 and a central longitudinal axis 1210 of cable preparation device 50.

In some examples, the measurement system may operate according to a feedback-loop mechanism. For example, computing device 52 may receive user input indicative of a target relative position or a target radial depth $D_R$ for cutting tool 1050. In response to receiving the target radial depth, computing device 52 may cause transceiver 1206 to transmit the signal and receive the reflected signal from signal reflection target 1202. Based on the travel time of the signal and a known velocity of the signal, computing device 52 may determine a current radial depth $D_R$ of cutting tool 1050. For example, the current radial depth $D_R$ of cutting tool 1050 may be equal to one-half of the total distance traveled by the signal, plus a constant.

Upon determining the current radial depth $D_R$ of cutting tool 1050, computing device 52 may compare the current radial depth to the target radial depth. If computing device 52 determines that the current radial depth is not equal to the target radial depth, computing device 52 may cause a driver 1026 to adjust the current radial depth. For example, computing device 52 may cause the driver 1026 to move cutting tool 1050 nearer to or farther from central longitudinal axis 1210, accordingly. Upon adjusting the current radial depth $D_R$, computing device 52 (e.g., processor 302) may once again cause transceiver 1206 to transmit the transmitted signal 1208 (e.g., a new transmitted signal 1208). Based on a corresponding detected reflected signal, computing device 52 may determine the new current radial depth $D_R$. Computing device 52 may then determine whether the new radial depth is equal to the target radial depth. This feedback loop may continue until computing device 52 determines that the current radial depth is equal to the target radial depth for cutting tool 1050.

Figure 10A:
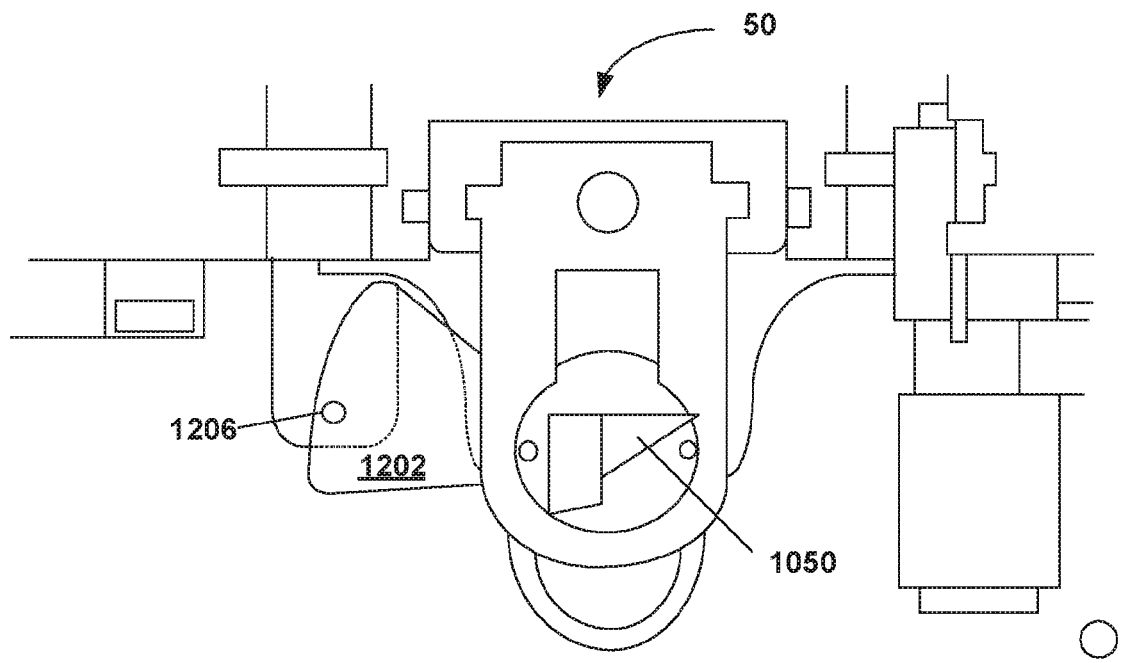
FIGS. 10A and 10B are respective overhead views of the example cable preparation device of FIG. 8.
Figure 10B:
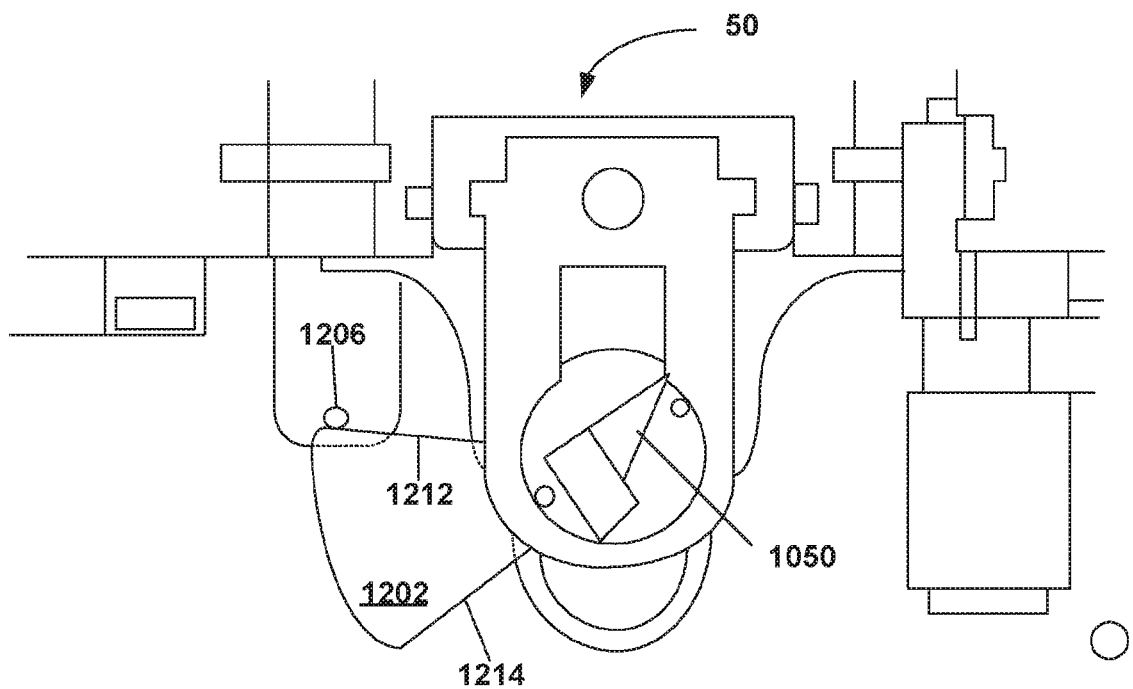

In addition to determining a radial depth $D_R$, the measurement system may additionally be configured to determine a relative rotation angle of cutting tool 1050. For example, FIGS. 10A and 10B are respective overhead views of the example cable preparation device 50 of FIG. 8. As shown in FIGS. 10A and 10B, computing device 52 may be configured to cause the driver 1026 to rotate cutting tool 1050 in order to determine a zero angle of rotation, or a homing rotation angle, of cutting tool 1050. As shown in FIG. 10A, computing device 52 may cause transceiver 1206 (depicted in FIG. 10A through a transparent signal reflection target 1202) to transmit a signal, such as a laser, toward an underside 1216 (FIG. 9) of signal reflection target 1202. Transceiver 1206 may detect a corresponding reflected signal and transmit an indication of the reflected signal to computing device 52. Upon receiving the indication of the reflected signal, computing device 52 may cause the driver mechanism 1026 to adjust the rotation angle of cutting tool 1050 by a fixed incremental amount in a predetermined direction. Computing device 52 may then cause transceiver 1206 to transmit a new signal in a fixed direction. Once cutting tool 1050 and reflection target 1202 have reached the zero or homing angle of rotation depicted in FIG. 10B, transceiver 1206 is no longer positioned directly underneath signal reflection target 1202. Accordingly, the transmitted signal 1208 will not reflect off of the underside of signal reflection target 1202 and transceiver 1206 will no longer be able to detect a respective reflected signal. At this point, computing device 52 determines that cutting tool 1050 is positioned at the zero angle. Computing device 52 may determine (e.g., measure or calculate) any further rotational angles, such as from a rotation by a known amount in either rotational direction, by using the zero angle as a reference.

In some examples, signal reflection target 1202 may be generally wedge-shaped or triangular-shaped, so as to define a first reference edge 1212 and a second reference edge 1214, defining a known (e.g., fixed) angle of rotation between the two edges. In these examples, computing device 52 may be able to determine the rotation angle of cutting tool 1050 with even greater accuracy by calibrating both the zero reference angle at the first edge 1212 as well as a second reference angle along the second edge 1214. For example, computing device 52 may determine the angle of rotation at which transceiver transitions between detecting a reflected signal and not detecting a reflected signal along first edge 1212. Computing device 52 may also determine the angle of rotation at which transceiver transitions between not detecting a reflected signal and detecting a reflected signal along second edge 1214. Computing device 52 may then calibrate the angle measurement system according to these two angles of rotation based on the known (e.g., fixed) angle of rotation between them as defined by the fixed shape of the signal reflection target 1202. For example, signal reflection target 1202 may define a fixed angle of rotation of between about 20 and 50 degrees, such as about 30 degrees, between edges 1212 and 1214.

In some examples, computing device 52 may be configured to initially calibrate the zero angle based on the signal reflecting off the edge of the reflection target, and then determine a current rotation angle of the cutting tool based on a change in rotation angle from the zero angle. For example, the driver 1026 may be configured to output a signal indicative of an amount of change of rotation angle as the driver 1026 adjusts the rotation angle of the cutting tool.

Figure 11:
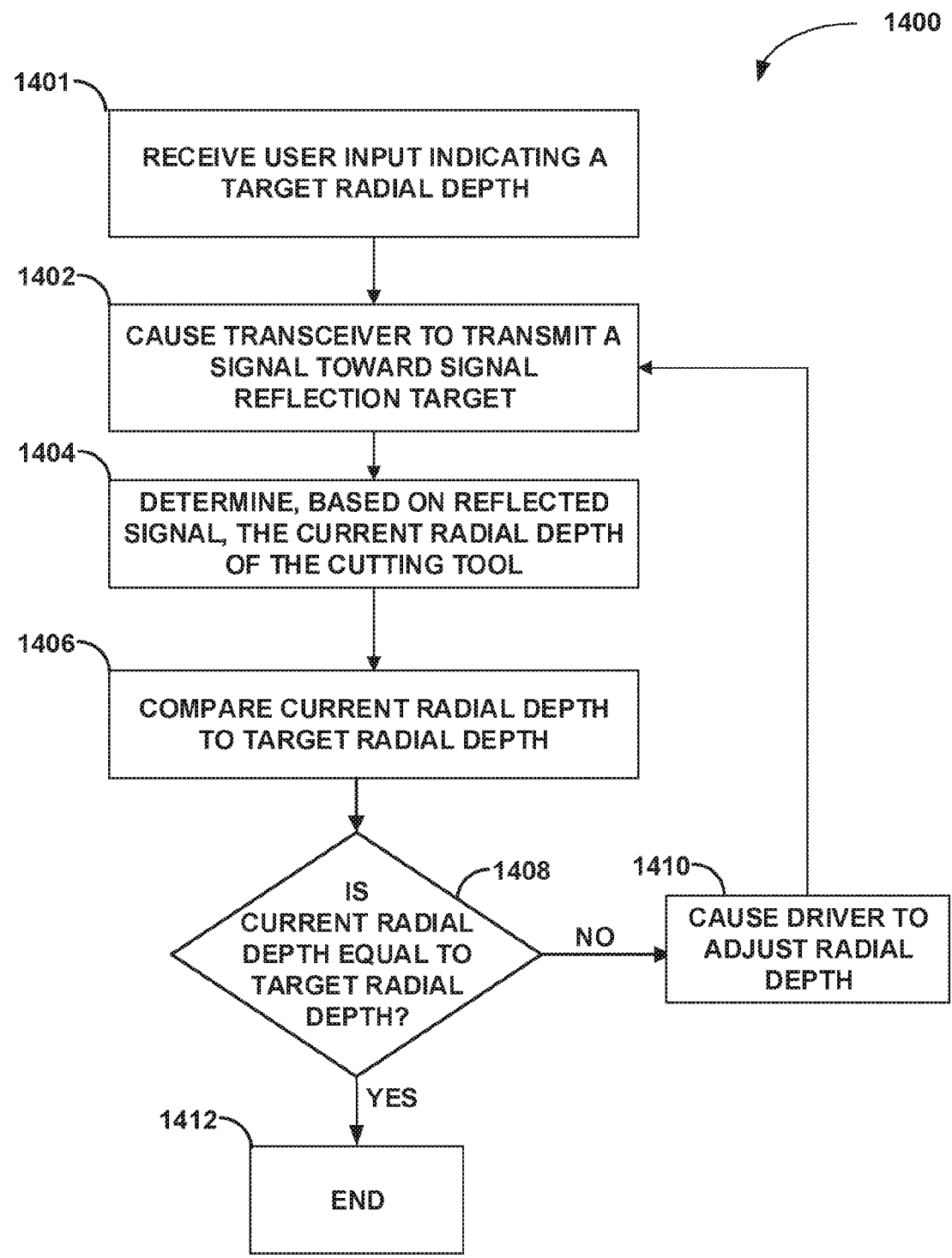
FIG. 11 is a flowchart depicting an example technique in accordance with this disclosure.

FIG. 11 is a flowchart depicting an example method 1400 in accordance with techniques of this disclosure. A processor 302 of a computing device 52 (FIG. 2B) receives user input indicating a target or intended radial depth of a cutting tool 1050 (FIG. 7A) of a cable-preparation device 50 relative to a central longitudinal axis 1210 (FIG. 9) of the cable-preparation device 50 (1401).

Processor 302 causes a transceiver to emit a signal toward a signal reflection target 1202 coupled to the cutting tool 1050 (1402). For example, a signal may include a laser or an ultrasonic pulse. The signal reflects off of the signal reflection target 1202 back toward the transceiver, where the transceiver (or a distinct signal detection device) detects the reflected signal. Based on a difference in time between the transmitted signal and the reflected signal, processor 302 determines (e.g., calculates) a travel distance of the signal, and based on the travel distance, a radial depth $D_R$ of cutting tool 1050 relative to the central longitudinal axis 1210 of the cable-preparation device 50 (FIG. 9) (1404).

Processor 302 compares the measured (e.g., current) radial depth $D_R$ to the target radial depth received via user input (1406). If the current radial depth $D_R$ does not match (e.g., is not equal to) the target radial depth (NO of 1408), processor 302 causes a driver device 1026 to adjust the radial depth $D_R$ of cutting tool 1050 (1410). In response, processor 302 causes transceiver 1206 to transmit another signal toward the reflection target (1402) to determine if the "new" radial depth is equal to the target radial depth. If the "new" radial depth is equal to the target radial depth (YES of 1408), the feedback loop may terminate (1412) and processor 302 may proceed to cause cable-preparation device 50 to prepare an end of an electrical cable.

Figure 12:
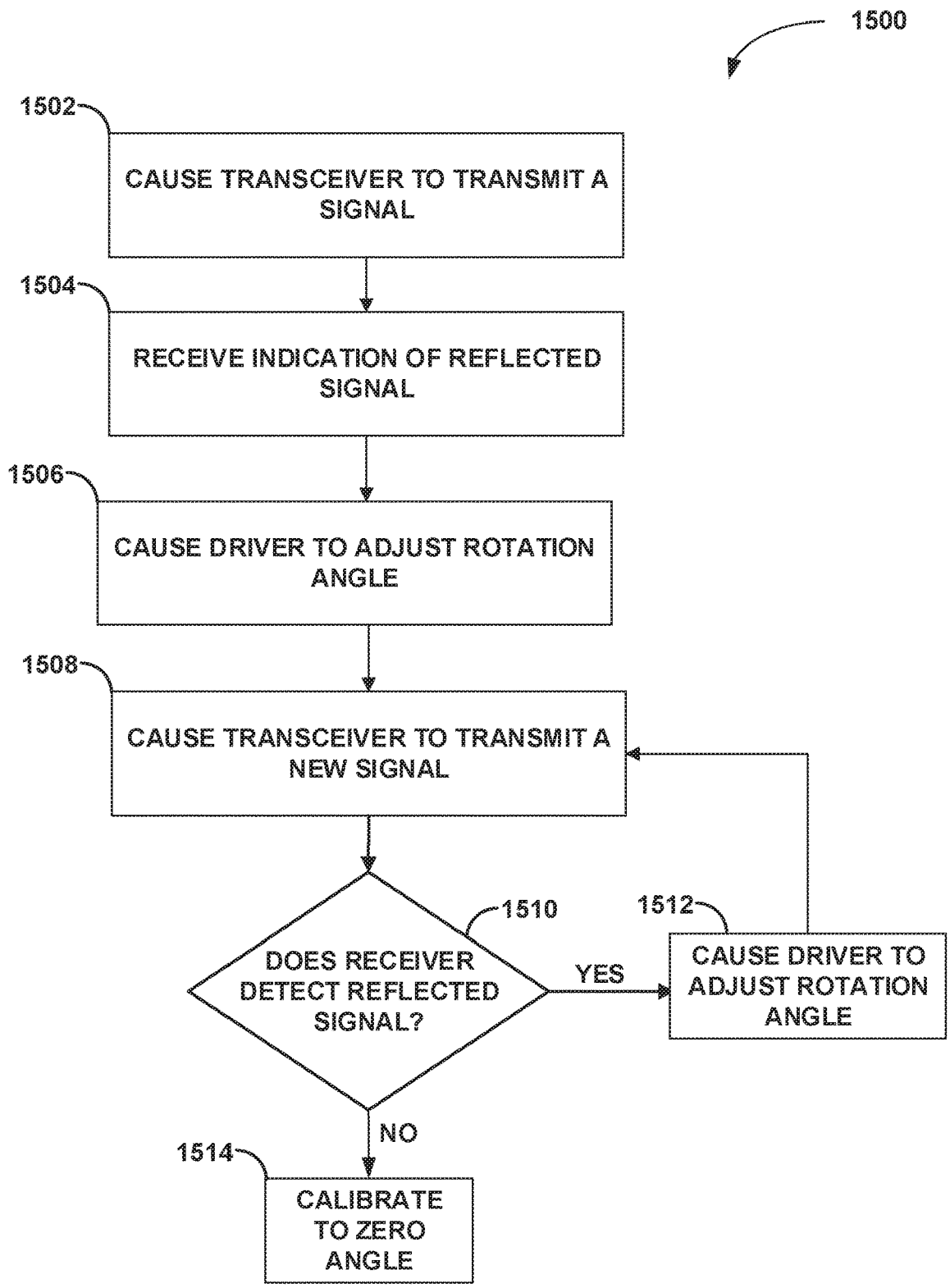
FIG. 12 is a flowchart depicting an example technique in accordance with this disclosure.

FIG. 12 is a flowchart depicting an example method 1500 for determining a rotation angle of a cutting tool of a cable-preparation device, in accordance with techniques of this disclosure. A processor 302 of a computing device 52 (FIG. 2B) causes a transceiver 1206 (FIG. 9) to transmit a signal, such as a laser (1502). Processor 302 may receive an indication from the transceiver 1206 (or a separate receiver device) of an indication of the transceiver having detected a reflected signal from a signal reflection target, indicating that the transceiver 1206 is directly underneath the signal reflection target 1202 (1504).

Processor 302 may then cause a driver 1026 to adjust a rotation angle of the cutting tool 1050 coupled to the signal reflection target 1202 by an incremental amount in a predetermined direction (1506). Processor 302 may cause transceiver 1206 to transmit a new signal in the same direction as the first signal (1508). Processor 302 then determines whether the processor subsequently receives an indication of the transceiver 1206 having detected a respective new reflected signal from the signal reflection target 1202 (1510). If the transceiver 1206 still detects a reflected signal (YES of 1510), this may indicate that the transceiver 1206 is still underneath the signal reflection target 1202, and that processor 302 has not yet identified an edge of the signal reflection target 1202. Accordingly, processor 302 may cause the driver 1026 to further adjust the rotational angle of the cutting tool (1512) and cause the transceiver to transmit another new signal (1508).

If the transceiver 1206 does not detect a reflected signal (NO of 1510), then processor 302 has identified an edge 1212 of signal reflection target 1202, indicating that the signal reflection target 1202 and the cutting tool 1050 are currently positioned at a zero or homing rotational angle. Accordingly, processor 302 may calibrate the rotational angle of cutting tool 1050 to this position (1514). For example, an incremental change in rotational angle by the driver 1026 may be known, such that any rotational angle of cutting tool 1050 may be determined as a known change in rotational angle from the zero angle.

In an alternate example of method 1500, after processor 302 initially causes transceiver 1206 to transmit a signal (1502), processor 302 may determine that transceiver 1206 does not detect a reflected signal, indicating that transceiver 1206 is currently not directly underneath signal reflection target 1202. Accordingly, in order to identify an edge 1212 of the reflection target 1202, processor 302 may cause the driver 1026 to adjust the rotation angle and transmit a new signal until the transceiver 1206 detects a reflected signal.

What is claimed is:

1. A system comprising:
    an electrical cable preparation device configured to cut at least one layer of an electrical cable, the electrical cable preparation device comprising a rotatable tool head comprising:
        a plurality of rollers;
        a cutting tool; and
        a reflection target coupled to the cutting tool;
    a transceiver configured to transmit a signal toward the reflection target and detect a reflected signal from the reflection target; and
    at least one computing device configured to:
        cause the transceiver to transmit the signal toward the reflection target; and
        determine, based on the reflected signal, a current relative position of the cutting tool relative to one or more reference points.

2. The system of claim 1, wherein the current relative position of the cutting tool comprises a distance between the cutting tool and a reference point.

3. The system of claim 2, wherein the reference point comprises a central axis of the rotatable tool head or a depth of the at least one layer of the electrical cable.

4. The system of claim 1, the computing device further configured to:
   receive user input indicative of a target relative position of the cutting tool; and
   determine whether the current relative position equals the target relative position.

5. The system of claim 4, the computing device further configured to:
   cause a driver to adjust the current relative position of the cutting tool in response to determining that the current relative position does not equal the target relative position; and
   cause the transceiver to transmit a second signal toward the reflection target.

6. The system of claim 1, the computing device further configured to determine, based on the reflected signal, a relative rotation angle of the cutting tool.

7. The system of claim 6, the computing device configured to determine the relative rotation angle of the cutting tool by:
   determining a zero angle of the cutting tool; and
   determining a change in rotation angle from the zero angle of the cutting tool.

8. The system of claim 7, the computing device configured to determine the zero angle of the cutting tool by causing a driver to rotate the cutting tool until the transceiver transitions between detecting the reflected signal and not detecting the reflected signal.

9. The system of any of claim 7, wherein the reflection target comprises a first edge and a second edge disposed at a fixed angle to the first edge, wherein the computing device is configured to determine the zero angle of the cutting tool based on the reflected signal at the first edge, and wherein the computing device is further configured to determine a second rotation angle of the cutting tool based on the reflected signal at the second edge.

10. The system of any of claim 1, wherein the transmitted signal comprises a laser signal or an ultrasonic signal.

11. The system of claim 1, wherein the cutting tool comprises at least one spring-loaded cutting tool.

12. The system of claim 1, wherein the reflection target comprises a reflective metal wedge.

13. A method comprising:
   causing, by a computing device, a transceiver to transmit a signal toward a reflection target coupled to a cutting tool of a cable preparation device and detect a reflected signal from the reflection target; and
   determining, by the computing device and based on the reflected signal, a current relative position of the cutting tool relative to one or more reference points.

14. The method of claim 13, wherein the current relative position of the cutting tool comprises a distance between the cutting tool and a reference point.

15. The method of any of claim 14, wherein the reference point comprises a central axis of the cable preparation device or a depth of at least one layer of an electrical cable positioned within the cable preparation device.

16. The method of claim 13, further comprising:
   receiving, by the computing device, a target relative position of the cutting tool; and
   determining whether the current relative position equals the target relative position.

17. The method of claim 16, further comprising;
   determining, by the computing device, that the current relative position does not equal the target relative position;
   causing a driver to adjust the current relative position of the cutting tool; and
   causing the transceiver to transmit a second signal toward the reflection target.

18. The method of claim 13, further comprising determining, by the computing device based on the reflected signal, a relative rotation angle of the cutting tool.

19. The method of claim 18, wherein determining the relative rotation angle of the cutting tool comprises determining, by the computing device, a zero angle of the cutting tool and determining a change in rotation angle from the zero angle of the cutting tool.

20. The method of claim 19, wherein determining the zero angle of the cutting tool comprises causing, by the computing device, a driver to rotate the cutting tool until the transceiver transitions between detecting the reflected signal and not detecting the reflected signal.

* * * * *